(12) United States Patent
Inamdar et al.

(10) Patent No.: US 11,556,870 B2
(45) Date of Patent: Jan. 17, 2023

(54) SYSTEM AND METHOD FOR VALIDATING A CANDIDATE RECOMMENDATION MODEL

(71) Applicant: Oracle International Corporation, Redwood Shores, CA (US)

(72) Inventors: Sonali Vijay Inamdar, Redwood City, CA (US); Simon Chow, San Francisco, CA (US); Carlos E. Hernández-Rincón, Zapopan (MX); Carolina Elizabeth Elias Arenas, Ecatepec de Morelos (MX)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 170 days.

(21) Appl. No.: 16/941,750

(22) Filed: Jul. 29, 2020

(65) Prior Publication Data
US 2022/0036282 A1 Feb. 3, 2022

(51) Int. Cl.
*G06Q 10/00* (2012.01)
*G06Q 10/06* (2012.01)
(Continued)

(52) U.S. Cl.
CPC .............. *G06Q 10/063112* (2013.01); *G06F 16/24578* (2019.01); *G06N 20/00* (2019.01)

(58) Field of Classification Search
None
See application file for complete search history.

(56) References Cited

U.S. PATENT DOCUMENTS 8,346,534 B2 1/2013 Csomai et al.
10,140,277 B2 11/2018 Unsal
(Continued)

FOREIGN PATENT DOCUMENTS

CN 103995775 A 8/2014
CN 104536877 B 4/2015

OTHER PUBLICATIONS

Lawton, George, How to optimize hyperparameter tuning for machine learning models, Mar. 27, 2020, TechTarget, https://www.techtarget.com/searchenterpriseai/feature/How-to-optimize-hyperparameter-tuning-for-machine-learning-models, pp. 1-5. (Year : 2020).*
(Continued)

*Primary Examiner* — Joseph M Waesco
(74) *Attorney, Agent, or Firm* — Tarolli, Sundheim, Covell & Tummino LLP

(57) ABSTRACT

In some examples a first parameter for respective applicants or candidates can be computed based on respective text data from a text dataset that can include a plurality of different types of text data. The first parameter can be populated with a given portion of text of the respective text data. A second parameter for a job requisition can be computed based on the respective text data used to compute the first parameter for a given applicant or candidate. The second parameter can be populated with a different portion of text of the respective text data used to compute the first parameter. Synthetic test data can be generated based on the computed parameters to test a machine learning (ML) ranking model that has been trained on training data that is from a different data source than the text dataset to validate a performance of the ML ranking model.

12 Claims, 27 Drawing Sheets

(51) Int. Cl.
*G06F 16/2457* (2019.01)
*G06N 20/00* (2019.01)

(56) References Cited

U.S. PATENT DOCUMENTS

| | | |
|---|---|---|
| 10,339,038 B1 | 7/2019 | Singh et al. |
| 2012/0124037 A1 | 5/2012 | Lee et al. |
| 2016/0246838 A1 | 8/2016 | Li et al. |
| 2018/0314617 A1* | 11/2018 | Khosrowpour ..... G06F 11/3409 |
| 2019/0065336 A1* | 2/2019 | Singhal ............... G06F 11/3409 |
| 2019/0147388 A1* | 5/2019 | Alexander ........... G06V 30/418 |
| | | 705/7.14 |
| 2020/0034774 A1* | 1/2020 | Swanson .......... G06Q 10/06398 |
| 2020/0057960 A1* | 2/2020 | Aminzadeh ............ G06N 7/005 |
| 2020/0311684 A1* | 10/2020 | Ma ..................... G06Q 10/1053 |
| 2021/0264332 A1* | 8/2021 | Pingali ............... G06Q 10/0631 |
| 2021/0272044 A1* | 9/2021 | Lee ...................... G06K 7/1417 |
| 2021/0319334 A1* | 10/2021 | Mitchell ................. G06N 5/04 |
| 2021/0319491 A1* | 10/2021 | Kushch .............. G06Q 30/0631 |
| 2021/0350078 A1* | 11/2021 | Choudhury ........... G06F 40/284 |
| 2021/0357835 A1* | 11/2021 | Modi ..................... G06F 40/194 |
| 2021/0390873 A1* | 12/2021 | Pu ....................... G06F 16/3329 |

OTHER PUBLICATIONS

Genrocket: Test Data for AI and ML; found on the internet Sep. 24, 2020 at: https://www.genrocket.com/ai-and-ml/.
Shobha etal: "Supervised Learning"; found on the internet Sep. 24, 2020 at: https://www.sciencedirect.com/topics/physics-and-astronomy/supervised-learning.

* cited by examiner

| Component | Distribution | JSON format example | Comments |
|---|---|---|---|
| Candidate ID Generator 322 | With X_i such that sum(X_i) = total # Candidates<br><br>X_1: percentage of records to come out of book text<br><br>X_2: percentage of records to come out of not random text (skills) | {<br>"title": "meta_data_definition",<br>"type": "candidate_distrubution",<br><br>"distribution": {<br>"book": .75,<br>"skill": .25<br>}<br>} | |
| Requisition ID Generator 324 | With X_i such that sum(X_i) = total # Requisitions<br><br>X_1: percentage of records to come out of book text<br><br>X_2: percentage of records to come out of not random text (skills) | {<br>"title": "meta_data_definition",<br>"type": "requisition_distrubution",<br>"distribution": {<br>"book": .75,<br>"skill": .25<br>}<br>} | |
| Applicant Generator 326 | With X_i such that sum(X_i) = total # Candidates<br><br>X_1: percentage of Candidates with no applications<br><br>X_2: percentage of Candidates with applications<br><br>With Y_i such that sum(Y_i) = total # Applicants using X_2 as Candidates<br><br>Y_1: percentage of Applicants with 1 applications<br><br>Y_2: percentage of Applicants with 2 applications<br><br>Y_3: percentage of Applicants with 3 applications<br><br>Y_4: percentage of Applicants with 4 applications | {<br>"title": "meta_data_definition",<br>"type": "applicants_distrubution",<br>"candidate_distribution": {<br>"candidate": {<br>"number_of_candidates": .25<br>},<br>"applicant": {<br>"number_of_candidates": .75,<br>"number_of_applications": [<br>"one": .20,<br>"two": .10,<br>"three": .5,<br>"four": .5,<br>"five": .4<br>]<br>}<br>}<br>} | |

FIG. 4

| | | | |
|---|---|---|---|
| Hiring Stage Generator 328 | With $X\_i$ such that $sum(X\_i)$ = total # Applicants<br><br>$X\_1$ = number of applicants rejected<br><br>$X\_2$ = number of applicants rejected offer<br><br>$X\_3$ = number of applicants in progress | `{`<br>`"title": "meta_data_definition",`<br>`"type": "applicant_stage",`<br>`"distribution": {`<br>`"rejected": .30,`<br>`"offer_rejected": .10,`<br>`"in_progress": .70`<br>`}`<br>`}` | |
| Work Experience Date Generator 330 | $X\_i$ : such that $sum(X\_i)$ = total # of candidates = 36k<br>  $X\_1$ count of records have 1-3 years of experience<br>  $X\_2$ have 4-8 YOE<br>  $X\_3$ have 9-15 YOE<br>  e.g. $(X\_1, X\_2, X\_3)$ = (10k, 16k, 10k)<br><br>$Y\_j$ : such that $sum(Y\_j) = X\_i$<br>  $Y\_1$ count of records have no overlap in experience duration<br>  $Y\_2$ have overlapping duration among experiences<br>  $Y\_3$ have no end date in 1 or more experiences<br>  e.g. $(Y\_1, Y\_2, Y\_3)$ = (8k, 1k, 1k) for $X\_1$<br>  e.g. $(Y\_1, Y\_2, Y\_3)$ = (12k, 4k, 0) for $X\_2$<br><br>$Z\_j$ : such that $sum(Z\_j) = X\_i$<br>  $Z\_1$ count of records have 1 experience<br>  $Z\_2$ have 2 experiences<br>  ...<br>  e.g. $(Z\_1, Z\_2, Z\_3, Z\_4, Z\_5, Z\_6, Z\_7)$ = (1k, 0, 3k, 2k, 4k, 0, 0) for $X\_1$<br>  e.g. $(Z\_1, Z\_2, Z\_3, Z\_4, Z\_5, Z\_6, Z\_7, Z\_8)$ = (1k, 1k, 3k, | `{`<br>`"title": "meta_data_definition",`<br>`"type": "years_of_experience",`<br>`"number_of_candidates": 36000,`<br>`"duration": [`<br>`  {`<br>`    "bounds": {`<br>`      "lower_bound_months": 12,`<br>`      "upper_bound_months": 36`<br>`    },`<br>`    "target_count": 0.4,`<br>`    "overlap": {`<br>`      "overlap_false": 0.9,`<br>`      "overlap_true": 0.05,`<br>`      "no_end_date": 0.05`<br>`    },`<br>`    "number_of_experiences": {`<br>`      "1": 0.3,`<br>`      "2": 0,`<br>`      "3": 0.1,`<br>`      "4": 0.4,`<br>`      "5": 0.2,`<br>`      "6": 0,`<br>`      "7": 0`<br>`    }`<br>`  },`<br>`  {`<br>`    "bounds": {`<br>`      "lower_bound_months": 48,`<br>`      "upper_bound_months": 96`<br>`    },`<br>`    "target_count": 0.2,`<br>`    "overlap": {`<br>`      "overlap_false": 0.7,`<br>`      "overlap_true": 0.3,`<br>`      "no_end_date": 0`<br>`    },`<br>`    "number_of_experiences": {`<br>`      "1": 0.1,`<br>`      "2": 0,`<br>`      "3": 0.1,`<br>`      "4": 0.2,`<br>`      "5": 0.3,`<br>`      "6": 0,`<br>`      "7": 0.25,` | |

```
{
  "name": "Chicago",
  "target_percentage": 0.2,
  "lat": 41.8781,
  "long": -87.6298
},
{
  "name": "Denver",
  "target_percentage": 0.2,
  "lat": 39.7392,
  "long": -104.9903
}
],
"distance": [
  {
    "lower_bound_distance_km": 0,
    "upper_bound_distance_km": 10,
    "target_percentage": 0.4
  },
  {
    "lower_bound_distance_km": 10,
```

```
{
    "candidate_application_distribution": {
        "applicant": {
            "number_of_applications": {
                "1": 0.2,
                "2": 0.1,
                "3": 0.2,
                "4": 0.1,
                "5": 0.4
            },
            "willingToRelocate": 0.1,
            "willingToTravel": 0.9
        },
        "candidate": {
            "willingToRelocate": 0.3,
            "willingToTravel": 0.5
        }
    },
    "counts": {
        "count_applicants": 5,
        "count_candidates": 5,
        "job_requisitions": 5
    },
    "duration": [
        {
            "bounds": {
                "lower_bound_months": 12,
                "upper_bound_months": 36
            },
            "number_of_experiences": {
                "1": 0.3,
                "2": 0,
                "3": 0.1,
                "4": 0.4,
                "5": 0.2,
                "6": 0,
                "7": 0
            },
            "overlap": {
                "no_end_date": 0.05,
                "overlap_false": 0.9,
                "overlap_true": 0.05
            },
            "target_count": 0.4
        },
        {
            "bounds": {
                "lower_bound_months": 48,
                "upper_bound_months": 96
            },
            "number_of_experiences": {
                "1": 0.1,
                "2": 0,
                "3": 0.1,
                "4": 0.2,
                "5": 0.3,
                "6": 0,
```

FIG. 10

```
            "7": 0.25,
            "8": 0.05
        },
        "overlap": {
            "no_end_date": 0,
            "overlap_false": 0.7,
            "overlap_true": 0.3
        },
        "target_count": 0.3
    },
    {
        "bounds": {
            "lower_bound_months": 108,
            "upper_bound_months": 180
        },
        "number_of_experiences": {
            "1": 0.2,
            "2": 0,
            "3": 0.2,
            "4": 0.2,
            "5": 0.2,
            "6": 0,
            "7": 0.2
        },
        "overlap": {
            "no_end_date": 0.05,
            "overlap_false": 0.8,
            "overlap_true": 0.15
        },
        "target_count": 0.4
    }
],
"hiring_stage": {
    "hiring_stage_phases": [
        {
            "distribution": {
                "REJECTED_EMPLOYER": 0.05,
                "TO_BE_SCREENED": 0.9,
                "WITHDRAWN_BY_CANDIDATE": 0.05
            },
            "phase_name": "NEW"
        },
        {
            "distribution": {
                "PHONE_SCREEN_COMPLETED": 0.2,
                "REJECTED_EMPLOYER": 0.2,
                "REVIEWED": 0.2,
                "TO_BE_REVIEWED": 0.2,
                "WITHDRAWN_BY_CANDIDATE": 0.2
            },
            "phase_name": "SCREENING"
        },
        {
            "distribution": {
                "REJECTED_EMPLOYER": 0.2,
                "SELECTED_FOR_OFFER": 0.5,
                "WITHDRAWN_BY_CANDIDATE": 0.3
```

FIG. 11

```
            },
            "phase_name": "INTERVIEW AND SELECTION"
        },
        {
            "distribution": {
                "OFFER_APPROVAL": 0.1,
                "OFFER_APPROVAL_REJECTED": 0.1,
                "OFFER_APPROVED": 0.1,
                "OFFER_DRAFT": 0.1,
                "OFFER_EXTENDED": 0.1,
                "REJECTED_EMPLOYER": 0.2,
                "WITHDRAWN_BY_CANDIDATE": 0.3
            },
            "phase_name": "OFFER"
        },
        {
            "distribution": {
                "REJECTED_EMPLOYER": 0.5,
                "WITHDRAWN_BY_CANDIDATE": 0.5
            },
            "phase_name": "HR"
        }
    ],
    "numberOfHiringStagesInJobRequisitions": {
        "1": 0.2,
        "2": 0.2,
        "3": 0.2,
        "4": 0.2,
        "5": 0.2
    }
},
"locations": {
    "cities": [
        {
            "city": "San Francisco",
            "target_percentage": 0.2
        },
        {
            "city": "Austin",
            "target_percentage": 0.3
        },
        {
            "city": "New York",
            "target_percentage": 0.4
        },
        {
            "city": "Chicago",
            "target_percentage": 0.1
        },
        {
            "city": "Denver",
            "target_percentage": 0.0
        }
    ],
    "distance": [
        {
            "lower_bound_distance_km": 0,
```

FIG. 12

```
                "target_percentage": 0.4,
                "upper_bound_distance_km": 10
            },
            {
                "lower_bound_distance_km": 10,
                "target_percentage": 0.4,
                "upper_bound_distance_km": 30
            },
            {
                "lower_bound_distance_km": 30,
                "target_percentage": 0.2,
                "upper_bound_distance_km": 50
            }
        ],
        "job_requisition": {
            "one_loc": 0.6,
            "three_loc": 0.2,
            "two_loc": 0.2
        }
    },
    "skills": {
        "behavioral": {
            "target_count": 0.2
        },
        "business": {
            "target_count": 0.4
        },
        "technical": {
            "target_count": 0.4
        }
    },
    "source_text": {
        "applicant_text_distribution": {
            "book_distribution": 0.75,
            "skill_distribution": 0.25
        },
        "candidate_text_distribution": {
            "book_distribution": 0.75,
            "skill_distribution": 0.25
        },
        "jobrequisition_text_distribution": {
            "book_distribution": 0.75,
            "skill_distribution": 0.25
        }
    },
    "template_file": "hr/cm/test/book_data/templates.json",
    "type": {
        "job_requisition_type_distribution": {
            "external": 0.2,
            "external_Internal": 0.7,
            "internal": 0.1
        },
        "type_candidate_applicant": {
            "external": 0.2,
            "external_Internal": 0.7,
            "internal": 0.1
        }
```

FIG. 13

```
HIRING_STAGE_META: {
HIRING_STAGE_PHASES: [
  {
    PHASE_NAME: "NEW",
    DISTRIBUTION: {
      REJECTED_EMPLOYER: 0.5,
      WITHDRAWN_BY_CANDIDATE: 0.5
    }
  },
  {
    PHASE_NAME: "SCREENING",
    DISTRIBUTION: {
      REJECTED_EMPLOYER: 0.2,
      WITHDRAWN_BY_CANDIDATE: 0.2,
      "TO_BE_REVIEWED": 0.2,
      "REVIEWED": 0.2,
      "PHONE_SCREEN_COMPLETED": 0.2
    }
  },
  {
    PHASE_NAME: "INTERVIEW AND SELECTION",
    DISTRIBUTION: {
      REJECTED_EMPLOYER: 0.2,
      WITHDRAWN_BY_CANDIDATE: 0.3,
      "SELECTED_FOR_OFFER": 0.5
    }
  },
  {
    PHASE_NAME: "OFFER",
    DISTRIBUTION: {
      REJECTED_EMPLOYER: 0.2,
      WITHDRAWN_BY_CANDIDATE: 0.3,
      "OFFER_APPROVAL": 0.1,
      "OFFER_APPROVAL_REJECTED": 0.1,
      "OFFER_APPROVED": 0.1,
      "OFFER_DRAFT": 0.1,
      "OFFER_EXTENDED": 0.1,
    }
  },
  {
    PHASE_NAME: "HR",
    DISTRIBUTION: {
      REJECTED_EMPLOYER: 0.5,
      WITHDRAWN_BY_CANDIDATE: 0.5
    }
  }
]
}
```

FIG. 14

```
{
    "job_requisition_skill_templates": {
        "templates":
            [
                {
                    "template": "Some job requisition template for <skill>.\n It's also required strong knowledge in <skill>.\nSome other things here <skill>."
                },
                {
                    "template": "A job requisition template for <skill>.It's also required strong knowledge in <skill>.Some other things here <skill>."
                },
                {
                    "template": "One more job requisition template for <skill>. It's also required strong knowledge in <skill>. Some other things here <skill>."
                }
            ]
    },
    "work_experience_skill_templates": {
        "templates":
            [
                {
                    "template": "Some work experience template for <skill>.It's also required strong knowledge in <skill>.Some other things here <skill>."
                },
                {
                    "template": "A work experience template for <skill>.It's also required strong knowledge in <skill>.Some other things here <skill>."
                },
                {
                    "template": "One more work experience template for <skill>.It's also required strong knowledge in <skill>.Some other things here <skill>."
                }
            ]
    }
}
```

```
{
    "requisitions": [
        {
            "description": "But Don Quixote, supported by his intrepid heart,
leaped on Rocinante, and bracing his buckler on his arm, brought his pike to
the slope, and said, Friend Sancho, know that I by Heaven\u2019s will have
been born in this our iron age to revive revive in it the age of gold, or the
golden as it is called; I am he for whom perils, mighty achievements, and
valiant deeds are reserved; I am, I say again, he who is to revive the
Knights of the Round Table, the Twelve of France and the Nine Worthies; and
he who is to consign to oblivion the Platirs, the Tablantes, the Olivantes
and Tirantes, the Phoebuses and Belianises, with the whole herd of famous
knights-errant of days gone by, performing in these in which I live such
exploits, marvels, and feats of arms as shall obscure their brightest deeds.
Thou dost mark well, faithful and trusty squire, the gloom of this night, its
strange silence, the dull confused murmur of those trees, the awful sound of
that water in quest of which we came, that seems as though it were
precipitating and dashing itself down from the lofty mountains of the Moon,
and that incessant hammering that wounds and pains our ears; which things all
together and each of itself are enough to instil fear, dread, and dismay into
the breast of Mars himself, much more into one not used to hazards and
adventures of the kind. Well, then, all this that I put before thee is but an
incentive and stimulant to my spirit, making my heart burst in my bosom
through eagerness to engage in this adventure, arduous as it promises to be;
therefore tighten Rocinante\u2019s girths a little, and God be with thee;
wait for me here three days and no more, and if in that time I come not back,
thou canst return to our village, and thence, to do me a favour and a
service, thou wilt go to El Toboso, where thou shalt say to my incomparable
lady Dulcinea that her captive knight hath died in attempting things that
might make him worthy of being called hers.\n\nHold! said he, for I am badly
wounded through my horse\u2019s fault; carry me to bed, and if possible send
for the wise Urganda to cure and see to my wounds.",
            "entityStatus": "ACTIVE",
            "locations": [
                {
                    "city": "San Francisco",
                    "country": "USA",
                    "latitude": "37.7749",
                    "longitude": "-122.4194",
                    "state": "California",
                    "zip": "94016"
                }
            ],
            "numberOfHiringStages": 3,
            "recommendationFlag": true,
            "requisitionId": "0615341815669541344B",
            "target": "external_Internal",
            "title": "Manager Knight"
        },
        {
            "description": "                        THESIS
SUBMITTED IN PARTIAL FULFILLMENT OF THE REQUIREMENTS
FOR THE              DEGREE OF DOCTOR OF PHILOSOPHY IN HISTORY\n\n198
Johnson to Lords of Trade, Jan. 31, 1766, N.Y. Col. Docs., VII, 809. When
Croghan was preparing to go to the Illinois in 1766 in order to pacify the
Indians, Johnson wrote him as follows As soon as I hear farther from the
General I shall write you and send the Instructions in which I shall insert
```

FIG. 16

1600 an Article directing you to enquire into the French bounds & Property at the Illinois. I have no objection to what you propose on that subject there, and as the French are now said to be retiring fast, you will have the better opportunity of making a good Choice on which the value will chiefly depend. Johnson to Croghan, Mar. 28, 1786, Johnson MSS, XII, 126.\n\n60 Croghans Journal of his transactions, from Feb. 28 to May 12, 1765, MS in Parkman Collection. Johnson to Burton, June 6, 1765, Johnson MSS, X, No. 263.\n\n64 Fraser to Gage, May 15, 1765, Ben. Coll., Eng. & Am., 1764-1765. Fraser to Crawford, May 20, 1765, _Mich. Pion. Colls._, X, 216-218. Fraser to Gage, May 26, 1765, Ben. Coll., Eng. & Am., 1764-1765. Gage to Johnson, Aug. 12, 1765, Parkman Coll., Pontiac, Miscell., 1765-1778.\n\nA few months later, in February, 1765, there arrived at Fort Chartres an English officer, accompanied by a trader named Crawford. They were probably the first Englishmen to penetrate thus far into the former French territory since the beginning of the war.43 They had been sent from Mobile by Major Farmer, the commandant at that place, to bring about the conciliation of the Indians in the Illinois.44 Instead of following the Mississippi, they worked their way northward through the great Choctaw and Chicksaw nations to the Ohio, descended the latter to the Mississippi and thence to the Illinois villages.45 Although St. Ange received them cordially46 and did all in his power to influence the savages to receive the English,47 the mission of Ross was a failure. The Indians had nothing but expressions of hatred and defiance for the English; even the Missouri and Osages from beyond the Mississippi had fallen under the influence of Pontiac.48 Ross and his companion remained with St. Ange nearly two months; but about the middle of April they were obliged to go down the river to New Orleans.49",
            "entityStatus": "ACTIVE",
            "locations": [
                {
                    "city": "Denver",
                    "country": "USA",
                    "latitude": "39.742043",
                    "longitude": "-104.991531",
                    "state": "Colorado",
                    "zip": "80014"
                },
                {
                    "city": "San Francisco",
                    "country": "USA",
                    "latitude": "37.7749",
                    "longitude": "-122.4194",
                    "state": "California",
                    "zip": "94016"
                }
            ],
            "numberOfHiringStages": 5,
            "recommendationFlag": true,
            "requisitionId": "0315341815665541461B1",
            "target": "external_Internal",
            "title": "Senior footnote"
        },
        {
            "description": "She went, however; and when they reached the farm, and she was to be put down, at the end of the broad, neat gravel walk, which led between espalier apple-trees to the front door, the sight of every thing which had given her so much pleasure the autumn before, was beginning to revive a little local agitation; and when they parted, Emma observed her

```
to be looking around with a sort of fearful curiosity, which determined her
not to allow the visit to exceed the proposed quarter of an hour. She went on
herself, to give that portion of time to an old servant who was married, and
settled in Donwell.\n\nMr. John Knightley here asked Emma quietly whether
there were any doubts of the air of Randalls.\n\nIt is unfortunate that they
cannot stay longer--but it seems a case of necessity. Mr. John Knightley must
be in town again on the 28th, and we ought to be thankful, papa, that we are
to have the whole of the time they can give to the country, that two or three
days are not to be taken out for the Abbey. Mr. Knightley promises to give up
his claim this Christmas--though you know it is longer since they were with
him, than with us.\n\nWe are sure of excellent fires, continued he, and every
thing in the greatest comfort. Charming people, Mr. and Mrs. Weston;--Mrs.
Weston indeed is much beyond praise, and he is exactly what one values, so
hospitable, and so fond of society;--it will be a small party, but where
small parties are select, they are perhaps the most agreeable of any. Mr.
Weston\u2019s dining-room does not accommodate more than ten comfortably; and
for my part, I would rather, under such circumstances, fall short by two than
exceed by two. I think you will agree with me, turning with a soft air to
Emma, I think I shall certainly have your approbation, though Mr. Knightley
perhaps, from being used to the large parties of London, may not quite enter
into our feelings.",
            "entityStatus": "ACTIVE",
            "locations": [
                {
                    "city": "Austin",
                    "country": "USA",
                    "latitude": "30.2672",
                    "longitude": "-97.7431",
                    "state": "Texas",
                    "zip": "73301"
                },
                {
                    "city": "Denver",
                    "country": "USA",
                    "latitude": "39.742043",
                    "longitude": "-104.991531",
                    "state": "Colorado",
                    "zip": "80014"
                },
                {
                    "city": "Chicago",
                    "country": "USA",
                    "latitude": "41.881832",
                    "longitude": "-87.623177",
                    "state": "Illinois",
                    "zip": "60007"
                }
            ],
            "numberOfHiringStages": 4,
            "recommendationFlag": true,
            "requisitionId": "0915341815669541516",
            "target": "internal",
            "title": "Junior amiable"
        }
    ]
}
```

{
    "description": "I conclude these remarks by copying the following
portrait of the religion of the south, which is, by communion and fellowship,
the religion of the north, which I soberly affirm is true to the life, and
without caricature or the slightest exaggeration. It is said to have been
drawn, several years before the present anti-slavery agitation began, by a
northern Methodist preacher, who, while residing at the south, had an
opportunity to see slaveholding morals, manners, and piety, with his own
eyes. Shall I not visit for these things? saith the Lord. Shall not my soul
be avenged on such a nation as this?\n\nAs the time drew near for our
departure, our anxiety became more and more intense. It was truly a matter of
life and death with us. The strength of our determination was about to be
fully tested. At this time, I was very active in explaining every difficulty,
removing every doubt, dispelling every fear, and inspiring all with the
firmness indispensable to success in our undertaking; assuring them that half
was gained the instant we made the move; we had talked long enough; we were
now ready to move; if not now, we never should be; and if we did not intend
to move now, we had as well fold our arms, sit down, and acknowledge
ourselves fit only to be slaves. This, none of us were prepared to
acknowledge. Every man stood firm; and at our last meeting, we pledged
ourselves afresh, in the most solemn manner, that, at the time appointed, we
would certainly start in pursuit of freedom. This was in the middle of the
week, at the end of which we were to be off. We went, as usual, to our
several fields of labor, but with bosoms highly agitated with thoughts of our
truly hazardous undertaking. We tried to conceal our feelings as much as
possible; and I think we succeeded very well.\n\nFrom this time I was never
again what might be called fairly whipped, though I remained a slave four
years afterwards. I had several fights, but was never whipped.\n\nColonel
Lloyd kept from three to four hundred slaves on his home plantation, and
owned a large number more on the neighboring farms belonging to him. The
names of the farms nearest to the home plantation were Wye Town and New
Design. Wye Town was under the overseership of a man named Noah Willis. New
Design was under the overseership of a Mr. Townsend. The overseers of these,
and all the rest of the farms, numbering over twenty, received advice and
direction from the managers of the home plantation. This was the great
business place. It was the seat of government for the whole twenty farms. All
disputes among the overseers were settled here. If a slave was convicted of
any high misdemeanor, became unmanageable, or evinced a determination to run
away, he was brought immediately here, severely whipped, put on board the
sloop, carried to Baltimore, and sold to Austin Woolfolk, or some other
slave-trader, as a warning to the slaves remaining.\n\nMr. Severe was rightly
named he was a cruel man. I have seen him whip a woman, causing the blood to
run half an hour at the time; and this, too, in the midst of her crying
children, pleading for their mothers release. He seemed to take pleasure in
manifesting his fiendish barbarity. Added to his cruelty, he was a profane
swearer. It was enough to chill the blood and stiffen the hair of an ordinary
man to hear him talk. Scarce a sentence escaped him but that was commenced or
concluded by some horrid oath. The field was the place to witness his cruelty
and profanity. His presence made it both the field of blood and of blasphemy.
From the rising till the going down of the sun, he was cursing, raving,
cutting, and slashing among the slaves of the field, in the most frightful
manner. His career was short. He died very soon after I went to Colonel
Lloyds; and he died as he lived, uttering, with his dying groans, bitter

FIG. 19

```
curses and horrid oaths. His death was regarded by the slaves as the result
of a merciful providence.",
    "entityStatus": "ACTIVE",
    "locations": [
        {
            "city": "New York",
            "country": "USA",
            "latitude": "40.7128",
            "longitude": "-74.006",
            "state": "New York",
            "zip": "10001"
        },
        {
            "city": "Chicago",
            "country": "USA",
            "latitude": "41.881832",
            "longitude": "-87.623177",
            "state": "Illinois",
            "zip": "60007"
        }
    ],
    "numberOfHiringStages": 4,
    "recommendationFlag": true,
    "requisitionId": "021534181605810406662",
    "target": "internal",
    "title": "Assistant Lloyd"
}
```

FIG. 20

```
{
    "applicants": {
        {
            "candidateId": "F5697A45DE",
            "entityStatus": "ACTIVE",
            "experience": {
                {
                    "employer": "Assistant marry",
                    "endDate": 1534181529.623752,
                    "jobFunction": "Assistant marry",
                    "responsibility": "Assistant marry",
                    "startDate": 1407951129.623752,
                    "summary": "There might be scruples of delicacy, my dear Emma. I have a very strong notion that it comes from him. I am sure he was particularly silent when Mrs. Cole told us of it at dinner.\n\nThat will never be, however, I can assure you. Miss Fairfax, I dare say, would not have me if I were to ask her--and I am very sure I shall never ask her.",
                    "title": "Assistant marry"
                }
            },
            "location": {
                "city": "San Francisco",
                "country": "USA",
                "latitude": 37.791373183122506,
                "longitude": -122.4996799379387,
                "state": "California"
            },
            "recommendationFlag": true,
            "requisitionId": "9315341815669541461B1",
            "willingToRelocate": false,
            "willingToTravel": true
        },
        {
            "candidateId": "099B37504A",
            "entityStatus": "ACTIVE",
            "experience": {
                {
                    "employer": "Proficient pianoforte",
                    "endDate": 1534181529.623752,
                    "jobFunction": "Proficient pianoforte",
                    "responsibility": "Proficient pianoforte",
                    "startDate": 1344879129.623752,
                    "summary": "But I am afraid, Mr. Elton, Harriet will not like to sit. She thinks so little of her own beauty. Did not you observe her manner of answering me? How completely it meant, \u2018why should my picture be drawn?\u2019\n\nWhom are you going to dance with? asked Mr. Knightley.\n\nShe hesitated a moment, and then replied, With you, if you will ask me.",
                    "title": "Proficient pianoforte"
                }
            },
            "location": {
                "city": "New York",
                "country": "USA",
```

FIG. 21

```
            "latitude": 40.52843416157984,
            "longitude": -74.1125931965765,
            "state": "New York"
        },
        "recommendationFlag": true,
        "requisitionId": "0615341815669541516163",
        "willingToRelocate": false,
        "willingToTravel": true
    },
    {
        "candidateId": "099B37504A",
        "entityStatus": "ACTIVE",
        "experience": [
            {
                "employer": "Proficient pianoforte",
                "endDate": 1534181529.623752,
                "jobFunction": "Proficient pianoforte",
                "responsibility": "Proficient pianoforte",
                "startDate": 1344879129.623752,
                "summary": "But I am afraid, Mr. Elton, Harriet will not
like to sit. She thinks so little of her own beauty. Did not you observe her
manner of answering me? How completely it meant, \u2018why should my picture
be drawn?\u2019\n\nWhom are you going to dance with? asked Mr.
Knightley.\n\nShe hesitated a moment, and then replied, With you, if you will
ask me.",
                "title": "Proficient pianoforte"
            }
        ],
        "location": {
            "city": "New York",
            "country": "USA",
            "latitude": 40.52843416157984,
            "longitude": -74.1125931965765,
            "state": "New York"
        },
        "recommendationFlag": true,
        "requisitionId": "0615341815669541346448",
        "willingToRelocate": false,
        "willingToTravel": true
    }
]
}
```

FIG. 22

```
{
    "candidateId": "44D91E1D67",
    "entityStatus": "ACTIVE",
    "experience": [
        {
            "employer": "Junior empathy",
            "endDate": 1534181603.410622,
            "jobFunction": "Junior empathy",
            "responsibility": "Junior empathy",
            "startDate": 1471109603.410622,
            "summary": "Some work experience template for Goal-Setting. It's also required strong knowledge in planning. Some other things here planning.",
            "title": "Junior empathy"
        }
    ],
    "location": {
        "city": "Austin",
        "country": "USA",
        "latitude": 30.255877137430364,
        "longitude": -97.80488135969412,
        "state": "Texas"
    },
    "recommendationFlag": true,
    "requisitionId": "11153418160581042623",
    "willingToRelocate": false,
    "willingToTravel": true
}
```

FIG. 23

```
{
    "candidates": [
        {
            "candidateId": "270D84DCFB",
            "entityStatus": "ACTIVE",
            "experience": [
                {
                    "employer": "Junior Python",
                    "endDate": 1534181529.623752,
                    "jobFunction": "Junior Python",
                    "responsibility": "Junior Python",
                    "startDate": 1471109529.623752,
                    "summary": "\n                Some work experience template for Amazon AWS.\n                It's also required strong knowledge in VMware.\n                Some other things here ML.\n                ",
                    "title": "Junior Python"
                }
            ],
            "location": {
                "city": "Austin",
                "country": "USA",
                "latitude": 30.257572302718103,
                "longitude": -97.74994261856662,
                "state": "Texas"
            },
            "recommendationFlag": true,
            "type": "external_Internal",
            "willingToRelocate": false,
            "willingToTravel": true
        },
        {
            "candidateId": "AB5393E7B2",
            "entityStatus": "ACTIVE",
            "experience": [
                {
                    "employer": "Freshly Graduated customer service",
                    "endDate": null,
                    "jobFunction": "Freshly Graduated customer service",
                    "responsibility": "Freshly Graduated customer service",
                    "startDate": 1471109529.623752,
                    "summary": "\n                A work experience template for Problem solving.\n                It's also required strong knowledge in Communication.\n                Some other things here sales.\n                ",
                    "title": "Freshly Graduated customer service"
                }
            ],
            "location": {
                "city": "New York",
                "country": "USA",
                "latitude": 40.709532913809205,
                "longitude": -74.0178851824054,
                "state": "New York"
            },
            "recommendationFlag": true,
            "type": "internal",
            "willingToRelocate": false,
            "willingToTravel": false
        }
    ]
}
```

Not grouped

FIG. 24

```
{
    "candidateId": "BF17E7514E",
    "entityStatus": "ACTIVE",
    "experience": [
        {
            "employer": "Advanced woman",
            "endDate": 1534181603.410622,
            "jobFunction": "Advanced woman",
            "responsibility": "Advanced woman",
            "startDate": 1344879203.410622,
            "summary": "During his present short stay, Emma had barely seen him; but just enough to feel that the first meeting was over, and to give her the impression of his not being improved by the mixture of pique and pretension, now spread over his air. She was, in fact, beginning very much to wonder that she had ever thought him pleasing at all; and his sight was so inseparably connected with some very disagreeable feelings, that, except in a moral light, as a penance, a lesson, a source of profitable humiliation to her own mind, she would have been thankful to be assured of never seeing him again. She wished him very well; but he gave her pain, and his welfare twenty miles off would administer most satisfaction.\n\nThe pain of his continued residence in Highbury, however, must certainly be lessened by his marriage. Many vain solicitudes would be prevented--many awkwardnesses smoothed by it. A _Mrs._ _Elton_ would be an excuse for any change of intercourse; former intimacy might sink without remark. It would be almost beginning their life of civility again.\n\nShe has had the advantage, you know, of practising on me, she continued--like La Baronne d\u2019Almane on La Comtesse d\u2019Ostalis, in Madame de Genlis\u2019 Adelaide and Theodore, and we shall now see her own little Adelaide educated on a more perfect plan.",
            "title": "Advanced woman"
        }
    ],
    "location": {
        "city": "New York",
        "country": "USA",
        "latitude": 40.90145101778656,
        "longitude": -73.81875596079135,
        "state": "New York"
    },
    "recommendationFlag": true,
    "type": "external_Internal",
    "willingToRelocate": true,
    "willingToTravel": false
}
```

FIG. 25

```
{
    "hiringStages": [
        {
            "candidateId": "099B37504A",
            "entityStatus": "ACTIVE",
            "id": "082655874065594",
            "isTerminalState": false,
            "phaseCode": "SCREENING",
            "requisitionId": "031534181566954215626",
            "stateCode": "REVIEWED"
        },
        {
            "candidateId": "83D9CC2FDD",
            "entityStatus": "ACTIVE",
            "id": "620932200830052",
            "isTerminalState": false,
            "phaseCode": "SCREENING",
            "requisitionId": "031534181566954215626",
            "stateCode": "PHONE_SCREEN_COMPLETED"
        },
        {
            "candidateId": "F5697A45DE",
            "entityStatus": "ACTIVE",
            "id": "843796922286595",
            "isTerminalState": true,
            "phaseCode": "HR",
            "requisitionId": "031534181566954146181",
            "stateCode": "REJECTED_EMPLOYER"
        },
        {
            "candidateId": "099B37504A",
            "entityStatus": "ACTIVE",
            "id": "474907803731980",
            "isTerminalState": true,
            "phaseCode": "HR",
            "requisitionId": "031534181566954146181",
            "stateCode": "WITHDRAWN_BY_CANDIDATE"
        },
        {
            "candidateId": "83D9CC2FDD",
            "entityStatus": "ACTIVE",
            "id": "984768224696989",
            "isTerminalState": true,
            "phaseCode": "HR",
            "requisitionId": "031534181566954146181",
            "stateCode": "WITHDRAWN_BY_CANDIDATE"
        }
    ]
}
```

```
{
    "candidateId": "578D28B768",
    "entityStatus": "ACTIVE",
    "id": "03404040950l864",
    "isTerminalState": true,
    "phaseCode": "HR",
    "requisitionId": "0315341816058l041825",
    "stateCode": "REJECTED_EMPLOYER"
}
```

FIG. 27

SYSTEM AND METHOD FOR VALIDATING A CANDIDATE RECOMMENDATION MODEL

TECHNICAL FIELD

This disclosure relates to a system and a method for validating a candidate recommendation model.

BACKGROUND

A great deal of resources is invested in identifying appropriate candidates for a job. Organizations and recruiters generally receive large volumes of resumes for a job opening. The sheer number of resumes received by such organizations can create challenges in vetting the resumes, such that the best candidates can be selected for the job. To ease these challenges, information filtering systems have been tailored for resume filtering to help organizations and recruiters in identifying qualified candidates.

SUMMARY

In an example, a computer implemented method can include computing a first parameter for each of a plurality of applicants or candidates based on respective text data from a text dataset that can include a plurality of different types of text data. The first parameter for each applicant or candidate can be computed by populating the first parameter with a given portion of text of the respective data. The computer implemented method can further include computing a second parameter for a job requisition based on the respective text data used to compute the first parameter for a given applicant or candidate of the plurality of applicants or candidates. The second parameter for the job requisition can be computed by populating the second parameter with a different portion of text of the respective data used to compute the first parameter for the given applicant or candidate. The computer implemented method can further include generating synthetic test data based on the computed first and second parameters to test a machine learning (ML) ranking model trained on training data that is from a different data source than the text dataset to validate a performance of the ML ranking model.

In another example, a system can include memory to store machine readable instructions, a text dataset that can include a plurality of different types of text data characterizing different texts, and metadata can include parameter logic for populating at least a work experience parameter for a plurality of applicants and candidates and a job requisition parameter for a job requisition. The system can further include one or more processors configured to access the memory and execute the machine readable instructions. The machine readable instructions can include a synthetic data generator and a performance evaluator. The synthetic data generator can be programmed to populate the work experience parameter with a given portion of text of respective text data from the text dataset based on the parameter logic. The work experience parameter can be computed for each of the plurality of applicants or candidates based on different text data from the dataset. The synthetic data generator can be further programmed to populate the job requisition parameter with a different portion of text of the respective text data used to compute the first parameter for a given applicant or candidate of the plurality of applicants or candidates. The synthetic data generator can be further programmed to generate synthetic test data based on the computed work experience parameter and job requisition parameter to test a learning to rank (LTOR) model trained on training data that is from a different data source than the text dataset to validate a performance of the LTOR model. The performance evaluator can be programmed to apply the synthetic test data to the LTOR model to cause the LTOR model to generate a ranking list to provide a ranking of each of the plurality of applicants or candidates relative to the job requisition. The performance evaluator can be further programmed to evaluate the generated ranking list relative to predicted performance data characterizing a predicted ranking performance of the LTOR model to determine whether the LTOR model is valid.

In an even further example, one or more non-transitory computer readable medium can include instructions that can be executable by a processor to perform a method. The method can include applying a weighting algorithm to respective text data from a text dataset that can include a plurality of different types of text data to identify a given portion of text of the respective text data. The method can further include generating a first parameter for each of a plurality of applicants or candidates based on corresponding text data from the text dataset. The first parameter generated for a given applicant or candidate of the plurality of applicants or candidates can be populated with the given portion of the text of the respective text data, and all first parameters for remaining applicants or candidates can be populated with a respective portion of text from different text data as used to populate the first parameter for the given applicant or candidate. The method can further include applying the weighting algorithm to the respective text data from the text dataset to identify a different portion of text of the respective text data, generating a second parameter with the different portion of the text of the respective text data for the given applicant or candidate of the plurality of applicants and candidates, and generating synthetic test data based on the computed first and second parameters to test a ML ranking model trained on training data that is from a different data source than the text dataset to validate a performance of the ML ranking model.

BRIEF DESCRIPTION OF THE DRAWINGS

FIGS. 4-9 illustrate an example of a table identifying parameter data generators of a data field generator of a synthetic data generator, respective distribution logic and JavaScript Object Notation (JSON) code for implementing the respective distribution logic.

FIGS. 10-13 illustrates an example of configuration metadata.

FIG. 14 illustrates an example of hiring stage model code.

FIG. 15 illustrates an example of a pre-defined template.

FIGS. 16-18 illustrates an example of job requisition data as ungrouped job requisition data.

FIGS. 19-20 illustrates an example of job requisition data as grouped job requisition data.

FIGS. 21-22 illustrates an example of applicant data as grouped applicant data.

FIG. 23 illustrate an example of applicant data as ungrouped applicant data.

FIG. 24 illustrates an example of candidate data as grouped candidate data.

FIG. 25 illustrates an example of candidate data as ungrouped candidate data.

FIG. 26 illustrates an example of hiring stage data as grouped hiring stage data.

FIG. 27 illustrates an example of hiring stage data as ungrouped hiring stage data.

DETAILED DESCRIPTION

Figure 1:
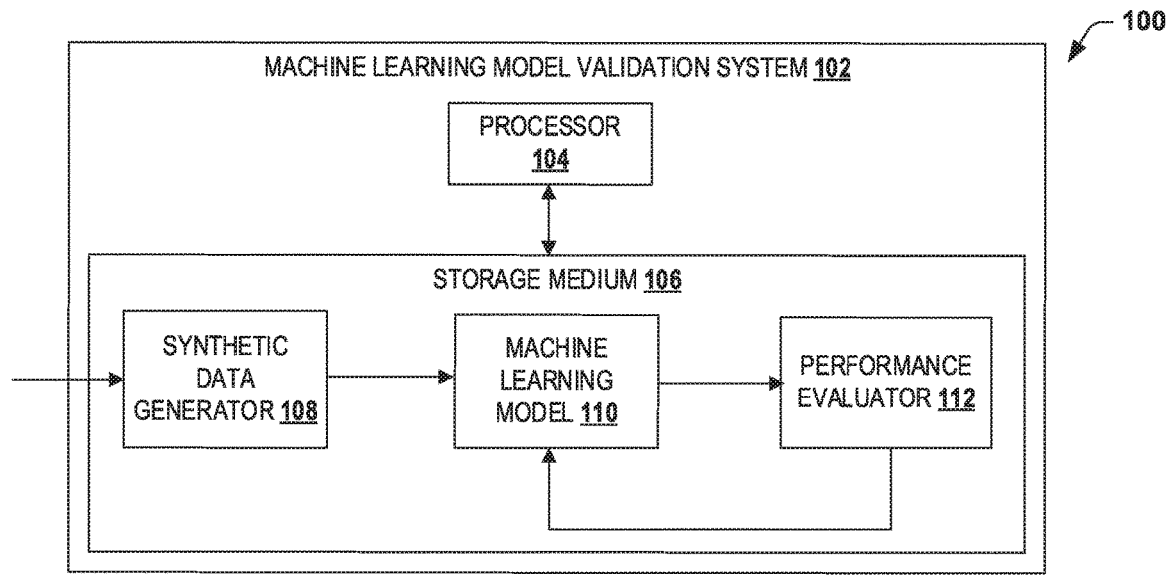
FIG. 1 illustrates an example of a machine learning (ML) model validation system.

Candidate recommendation systems are information filtering systems that have been configured to predict or identify candidates from a set of candidates that are most qualified (e.g., best fit) for a function, referred to herein as an objective. For example, candidate recommendation systems can be configured to recommend a set of most qualified applicants or other individuals for a particular job, position, or contract or similarly, a best-fit job for a specific individual from a set of available job openings, positions, or contracts. Accordingly, the term "candidate" as used herein can refer to individuals for whom a candidate document, such as a resume, a project description, a job application, or a bio is available, a corporate entity for which a candidate document, such as a corporate website or a set of bios or resumes for relevant employees, is available, contracts, represented by a summary of the contract terms and the responsibilities of the contracting parties, or positions or jobs in which a candidate document, such as a job requisition or a less formal free-text description of the requirements and responsibilities for the job or position, is available. In some examples, the term "candidate" as used herein can include a job description for a job.

Candidates can be matched to "objectives", which can be a job, a position, a project, or a contract to which an individual or corporate entity is matched, or an individual or corporate entity to which an appropriate job, a contract, or a position is matched. In some examples, the candidate recommendation system can be designed and trained to match specific type of candidates (e.g., job applications) to a specific type of objective (e.g., a job opening). In this example, information about the objective can be provided to the system when a candidate ranking is desired, although in other examples the information could instead be loaded and indexed prior to a candidate ranking request. In another example, a single system can be employed containing candidates of varying types (e.g., job candidates and job openings). In such a system, the objective is the candidate for which a query can be submitted, and the objective can be matched to candidates of a different type.

Candidate recommendation systems can be configured with machine learning (ML) algorithms that can be programmed to implement candidate identification processing. These systems are often provided to organizations with an ML model (e.g., a supervised ML model), such as a ranking model, that has been trained using training data from an industry that is different from the organization's industry in which a candidate recommendation system is to be used. For example, organization developing candidate recommendation systems can be in a software industry whereas the organizations in which the developed systems are to be used can be in a human resource industry, such as candidate identification and procurement industry.

During a design phase (e.g., an engineering phase), candidate recommendation system developers train the ML model on non-industry relevant training data (e.g., training data that is relevant to the developers industry and not to the industry in which the ML model is to be employed), as industry relevant training data for the ML model is not readily available, not a sufficient amount of the industry relevant training data is available or the industry relevant training data is not available at all. The term "non-industry relevant," as used herein, can be a modifier relating to data that has more relevance in a given industry than another industry. For example, non-industry relevant training data can include resumes that have been tailored for a job in an industry different from which the candidate recommendation system is to be employed. By comparison, industry relevant training data can include resumes that have been tailored for a job in the industry in which the candidate recommendation system is to be utilized.

Following training of the ML model, recommendation system developers are tasked with testing the ML model to validate a performance of the model to confirm that the model has been trained correctly (e.g., behaving as expected). In some examples, validation can include evaluating a ranking quality for the ML model relative to an expected ranking quality for the ML model. However, developers lack industry relevant testing data that would enable for accurate performance testing of the ML model, thereby the candidate recommendation system. Thus, organizations developing candidate recommendation systems have no way of validating (e.g., testing) a performance of the ML model before the ML model is employed in an intended industry (e.g., a recruiting industry). Use of testing data (e.g., validation data) representing a portion of the training data used to train the ML model does not allow for accurate performance verification of the candidate recommendation model, as such testing data is not from the industry in which the ML model is to be employed.

Systems and methods are described herein that enable organizations developing ML models for candidate recommendation systems to verify an ML model at a higher performance accuracy. By employing synthetic test data generated according to the systems and methods described herein having a particular data structure (e.g., organization and parameter configuration), and that is not from a similar data source as training data used to train the ML model developers can confirm that the ML model has a greater ranking quality than an ML model tested (e.g., validated) on a portion of data of the training data used to train the ML model. Thus, the systems and methods described herein can overcome existing problems associated with validation of ML models in candidate recommendation systems to provide a technical solution that allows organizations developing candidate recommendation systems to verify the performance of an ML model at a greater accuracy. Thus, the systems and methods described herein enable candidate recommendation system developers to confirm the performance of the ML model and that the ML model is operating within design parameters (e.g., behaving as expected). Examples are provided herein in context of resume-to-job recommendation, however, this disclosure should not be construed or limited to only encompass candidate matching, and can include, in other examples, different recommendation applications, such as employee matching (e.g., recommending employees for projects, functions, etc.), document matching, item matching, movie matching, song matching, consumer matching, etc.

According to the system and methods herein, a synthetic data generator can be programmed to generate the synthetic test data for validating the performance of the ML model. The term "synthetic" as used herein can be a modifier relating to test data that is from a different data source than data used for training the ML model. Thus, in some examples, the synthetic data can be independent from training data used to train the ML model but can follow a similar probability distribution as the training data. The synthetic data can be provided to the candidate recommendation model. The candidate recommendation model can be programmed to output result data. In some examples, the result data is a prediction. In some examples, the prediction is a given ranking order (e.g., ranking quality) of candidates or applicants. The prediction can be supplied to a performance evaluator. The performance evaluator can be programmed to determine a performance quality of the ML model based on the prediction and quantify the performance quality. In some examples, the performance evaluator can be configured to determine whether the ML model is within a given range (e.g., percentage, such as 5%) of a predicted performance (e.g., an expected performance) for the ML model.

In some examples, in response to determining that the ML model is valid (e.g., behaving as expected) or not valid, the performance evaluator can be programmed to output display data for displaying on a display to notify a user of the models performance. In further examples, in response to determining that the ML model is not valid, the performance evaluator can be programmed to communicate with an ML trainer. The ML trainer can be programmed to implement a corrective action. In some examples, the ML trainer can be configured to adjust an initial set of training parameters used to train the ML model by identifying a new set of training parameters for the ML model. The ML trainer can be configured to train (e.g., retrain) or cause the ML model to be trained based on the new set of training parameters. The performance of the trained ML model can be re-evaluated to confirm that the ML model is valid relative to the predicted performance. By enabling organizations developing ML models for candidate recommendation systems to verify the performance of the ML model based on a different type of training data than that used to train the ML model enables developers to confirm that the ML model at a greater accuracy that the ML model has a ranking quality sufficient for deployment at an organization until the ML model can be trained and validated on relevant industry training data. As described herein, the ML model is validated based on synthetic test data that is from a different data source type than the training data employed to train the ML model.

FIG. 1 illustrates an example of a machine learning (ML) model validation system 102. The system 102 can be implemented on one or more physical devices (e.g., servers) that can reside in a cloud computing environment or on a computer, such as a laptop computer, a desktop computer, a tablet computer, a workstation, or the like. In the present example, although the components of the system 102 are illustrated as being implemented on a same system, in other examples, the different components could be distributed across different systems and communicate, for example, over a network, including a wireless network, a wired network, or a combination thereof.

The system 102 can include a processor 104 and a storage medium 106. The storage medium 106 can be representative of a non-volatile data storage, such as a hard disk drive, a solid-state drive, flash memory, etc. In some examples, the storage medium 106 can include a single discrete article or multiple articles interconnected to allow for data transfer among them, for example, via an associated bus or a local or wide-area network connection. The storage medium 106 can include a synthetic data generator 110, a machine learning (ML) model 110 and a performance evaluator 112 that can be representative of program instructions that can be read and executed by the processor 104. The programs instructions when executed by the processor 104 can carry out at least a portion of the functionality described herein as being performed by the ML model validation system 102, including testing of the ML model 110 to validate a performance of the ML model 110 (e.g., to confirm that the ML model 110 is behaving as expected). In some examples, the synthetic data generator 110 and the performance evaluator 112 can define (e.g., form part of) the ML model validation system 102. In other examples, the ML model validation system 102 can include the ML model 110.

By way of example, the synthetic data generator 108 can be programmed to receive or retrieve text data. In some examples, the text data can include skillset data. In some examples, the text data can be generated based on a different data source than used to train the ML model 110. Thus, in some examples, the ML model 110 can correspond to a trained ML model 110. In some examples, the ML model 110 is a learning to rank (LOR) model. In other examples, the ML model 110 is a different ML model. In some examples, the text data can include text from a plurality of different text sources. In further examples, the plurality of different text sources can be represented as text files having a .txt file format. In some examples, the text data can correspond to given text data from a text dataset that can include a plurality of different types of text data. The skillset data can include a set of words, phrases, and/or sentences relating to a skillset for a candidate or an applicant. In some examples, the skillset data can include words that can be categorized into technical, business and behavioral skills. Thus, the skillset data can include technical words, business words and/or behavioral words. In some examples, the skillset data can include or characterize a predefined template for which the synthetic data generator 108 can be programmed to populate with skills (e.g., a technical skill) from a predefined list of words characterizing technical, business and/or behavioral words.

By way of example, the synthetic data generator 108 can be programmed to receive the text data and process the text data to generate synthetic test data for validating the performance of the ML model 110. In some examples, the text data can correspond to given text data from a text dataset that can include a plurality of different types of text data. The synthetic test data 110 can characterize entity data that can include job requisition data, applicant data, candidate data, and/or hiring stage data. The synthetic data generator 108 can be programmed to generate each dataset by populating a set of parameters identified in metadata that can define (e.g., form) a corresponding dataset. In some examples, the metadata can include parameter logic for populating at least a work experience parameter for a plurality of applicants and candidates and a job requisition parameter for a job requisition, as described herein. The synthetic data generator 108 can be programmed to populate each parameter of each dataset (e.g., the job requisition data, the applicant data, the candidate data, and/or the hiring stage data) based on the metadata. The synthetic data generator 108 can be programmed to receive the metadata and populate at least some parameters of the job requisition data, applicant data, candidate data, and/or hiring stage data based on the metadata to provide the synthetic test data. Thus, the synthetic data generator 108 can be programmed to generate the synthetic test data based on the text data as defined by the metadata.

In some examples, at least one parameter of the applicant and/or the candidate data (e.g., a work experience parameter) can be a free text parameter. In further examples, at least one parameter of the job requisition data (e.g., a job requisition title parameter, a job requisition description parameter, etc.) can be a free text parameter. The synthetic data generator 108 can be programmed to populate the at least one parameter of the applicant and/or the candidate data and the at least parameter of the job requisition data with text (e.g., one or more words, sentences, etc.) from the text data according to the metadata. To populate these parameter fields, and in some examples other parameters of the job requisition data, the applicant data, the candidate data, and/or the hiring stage data, the synthetic data generator 108 can be programmed to identify corresponding portions of text from a given text characterized by the text data and employ a weighting algorithm to identify a subset of words within the corresponding portions of text. In some examples, the subset of words can be identified by the synthetic data generator 108 by employing a term frequency-inverse document (TF-IDF) algorithm. In other examples, the subset of words can be identified by the synthetic data generator 108 by employing a different type of weighting algorithm.

In some examples, the synthetic data generator 108 can be programmed to generate a plurality of instances of candidate data and applicant data based on the metadata. In some examples, subsets of the plurality instances of the data can be generated based on a similar text of the plurality of texts according to the metadata. For example, first candidate data and the job requisition data can be generated by the synthetic data generator 108 based on a given text of the plurality of texts characterized by the text data. Thus, at least one parameter of the first candidate data and the at least one parameter of the first job requisition data can be based on different text portions but from the same text (e.g., the given text). By way of example, the at least one parameter of the first candidate data can include a subset of words from a portion of the given text and the at least one parameter of the job requisition data can include a subset of words identified from a different portion of the given text than the portion used for the first candidate data. Thus, the synthetic data generator 108 can be programmed to generate the plurality of instances of the candidate data based on respective texts from the plurality of texts of the text data, wherein one instance of the candidate data (e.g., the first candidate data) can be provided to have at least one parameter that can be generated from a similar text as the at least one parameter of the job requisition data. Other instances of the candidate that can be generated by the synthetic data generator 108 can include at least one parameter that is generated from a different text than can be employed for generation of the at least one parameter of the job requisition data. In some examples, the synthetic data generator 108 can be programmed to generate a plurality of instances of the applicant data based on respective texts of the plurality of texts of the text data, wherein one instance of the applicant data (e.g., a first applicant data) can be provided to have at least one parameter that can be generated from a similar text (e.g., the given text) as the at least one parameter of the job requisition data.

By way of further examples, the plurality of instances of the applicant data can include the first applicant data that can include the at least one parameter that can be populated with a subset of words from a first text, second applicant data that can include at least one parameter that can be populated with a subset of words from a second text, third applicant data that can include at least one parameter that can be populated with a subset of words from a third text, etc. As described herein, in some examples, the at least one parameter of the job requisition data can be populated with a subset of words from one of the first text, the second text, etc. Thus, the synthetic test data generated by the synthetic data generator 108 can characterize a plurality of instances of the applicant data and/or the candidate data wherein at least one instance of the applicant data or the candidate data can include at least one parameter that has been populated with a subset of words from a similar text (e.g., Alice in Wonderland) as the at least one parameter that has been populated of the job requisition data.

In some examples, the synthetic data generator 108 can be programmed to provide (e.g., apply) the synthetic test data to the ML model 110 to validate the performance of the ML model 110. The ML model 110 can be programmed to generate a prediction. In some examples, the prediction is a ranked candidate list. The ranked candidate list can provide a ranking of applicants or candidates relative to the job requisition. The prediction can be provided to the performance evaluator 112 to evaluate the performance of the ML model 110. The performance evaluator 112 can be programmed to evaluate the prediction to determine a prediction quality for the ML model 110.

The performance evaluator 112 can be programmed to compare the prediction quality for the prediction to an expected prediction quality for the ML model 110. If the prediction quality is greater than or equal to the expected prediction quality this can be indicative that the ML model 110 is valid (e.g., behaving as expected). If the prediction quality is less than the expected prediction quality this can be indicative that the ML model 110 is not valid (e.g., not behaving as expected). In some examples, the performance evaluator 112 can be programmed to generate validation result data characterizing whether the ML model 112 is valid or is not valid. The performance evaluator 112 can be programmed to provide the validation result data to an output device (not shown in FIG. 1) for displaying thereon.

In some examples, the performance evaluator 112 can be programmed to train or retrain the ML model 110 in response to determining that the ML model 110 is not valid. In some examples, the performance evaluator 112 can be programmed to determine training parameters for the ML model 110. As an example, the training parameters can include hyperparameters, as described herein, or in some examples, additional or different parameters. In response to retraining the ML model 110, the performance evaluator 112 can be programmed to communicate with the synthetic data generator 108 to re-test and thus validate the performance of the ML model 110 based on the synthetic test data 220 that has been trained based on the training parameters. The performance evaluator 112 can be programmed to determine if the re-trained ML model 110 is functioning as expected, and thus is valid by comparing a new outputted prediction from the re-trained ML model 110 to the expected prediction quality. The ML model validation system 102 can be configured to continue to re-train the ML model by continuously applying the synthetic test data to the ML model 110 and evaluating the outputted prediction from the ML model 110 relative to the expected prediction quality until the outputted prediction is greater than or equal to the expected prediction quality.

Accordingly, by employing synthetic test data that is not from a similar data source as the training data (e.g., non-industry relevant training data) used for training the ML model 110, the performance of the ML model 110 can be more robustly tested and enable developers to predict the performance of the ML model 110 at a greater accuracy to confirm that the ML model 110 has a ranking quality that is within intended design parameters. By confirming the ranking quality of the ML model 110 before the ML model 110 is employed and trained based on industry relevant training data (e.g., training data that is different from the training data on which the ML model 110 was initially trained), the ML model 110 can provide better predictions than an ML model that has not been tested based on the synthetic data generated by the synthetic data generator 108. Thus, the ML models 110 performance can be verified based on a different type of testing data than that used to train the ML model 110 thereby enabling developers to confirm that the ML model 110 at a greater accuracy that the ML model 110 has a greater ranking quality than an ML model 110 tested on a portion of data from the training data used to train the ML model 110.

Figure 2:
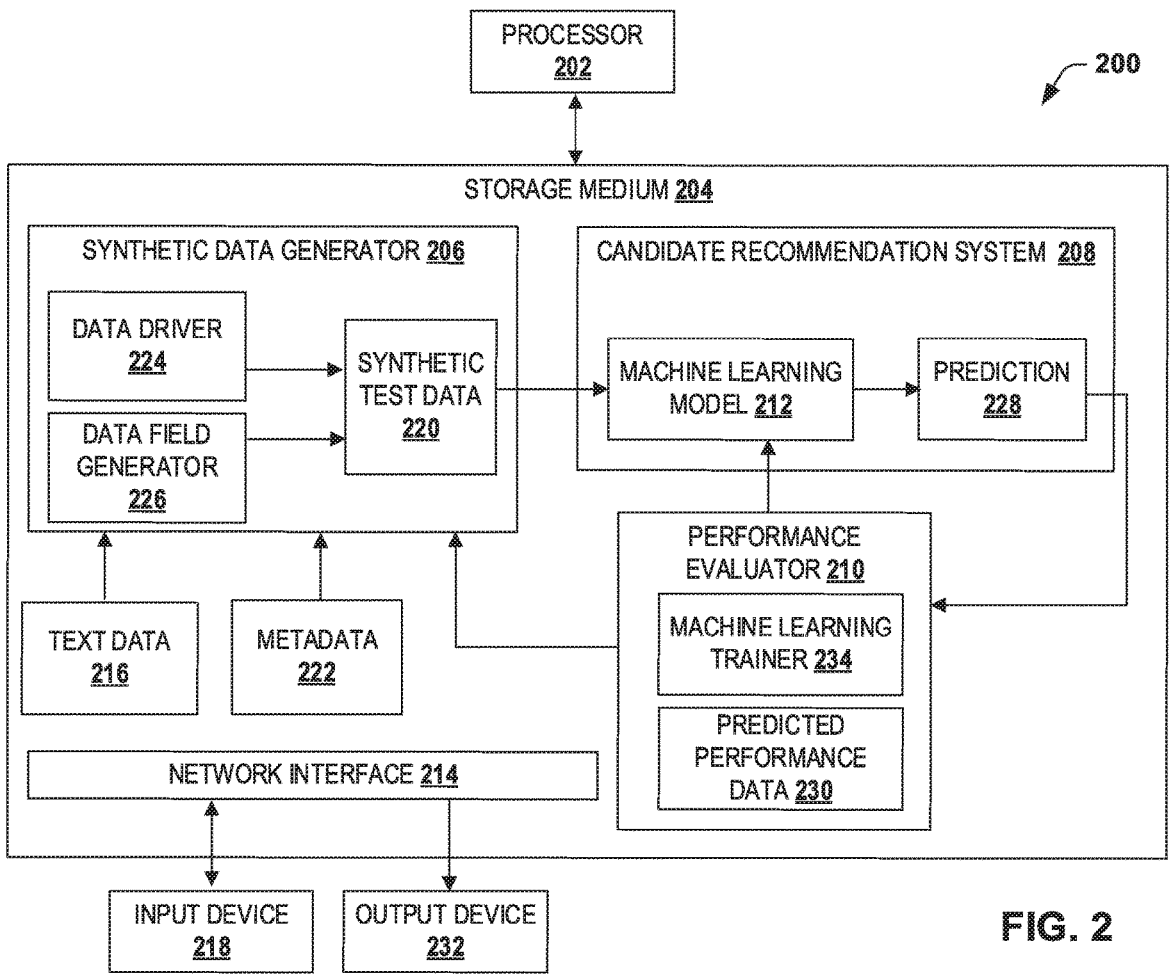
FIG. 2 illustrates an example environment for validating a ML model.

FIG. 2 illustrates an example environment 200 for validating a machine learning (ML) model. In some examples, the environment 200 includes a processor 202 and a storage medium 204. The storage medium 204 can be representative of a non-volatile data storage, such as a hard disk drive, a solid-state drive, flash memory, etc. In some examples, the storage medium 204 can include a single discrete article or multiple articles interconnected to allow for data transfer among them, for example, via an associated bus or a local or wide-area network connection. The storage medium 204 can include a synthetic data generator 206, a candidate recommendation system 208, and a performance evaluator 210. Each of the synthetic data generator 206, the candidate recommendation system 208, and the performance evaluator 210 can be representative of program instructions that can be read and executed by the processor 202. The programs instructions when executed by the processor 202 can carry out at least a portion of the functionality described herein as being performed by the synthetic data generator 206, the candidate recommendation system 208 and the performance evaluator 210, including testing a machine learning (ML) model 212 of the candidate recommendation system 208 to validate a performance of the ML model 212. In some examples, the synthetic data generator 206 can correspond to the synthetic data generator 108, the ML model 212 can correspond to the ML model 110, and the performance evaluator 210 can correspond to the performance evaluator 112, as illustrate in FIG. 1. Thus, in these examples, the synthetic data generator 206 and/or the performance evaluator 210 can define the ML validation system 102, as illustrated in FIG. 1. Although FIG. 2 illustrates the ML model 212 as part of the candidate recommendation system 208, in other examples the ML model 212 can be separate from the candidate recommendation system 208.

In some examples, the executable instructions stored on the storage medium 204 can include a network interface 214 via which the synthetic data generator 206, the candidate recommendation system 208 or the performance evaluator 210 can be programmed to communicate with other systems (e.g., other organization systems, such as a data repository or collection systems) via a network connection, for example, an Internet connection or a connection to an internal network.

The synthetic data generator 206 can be programmed to employ the network interface 214 to receive or retrieve text data 216 from an input device 218. The text data can represent data from a different data source than training data used for training the ML model 212. In some examples, the ML model 212 is a learning to rank (LTOR) model. In other examples, the ML model 212 is a different ML model. In some examples, the text data 216 can include text from a given data source, such as a set of books (e.g., Alice in Wonderland, Huckleberry Finn, Frankenstein, Dracula, A Christmas Carol, etc.). In additional or alternative examples, the text data 216 can characterize a plurality of different texts, such as a plurality of different books and can be referred to a book dictionary. In further examples, the plurality of different texts can be represented as text files having a .txt file format. In some examples, the text data 216 can include skillset data. In some examples, the text data 216 can correspond to given text data from a text dataset that can include a plurality of different types of text data. In other examples, the text data 216 can correspond to the text data set. The skillset data can include a set of words, phrases, and/or sentences relating to a skillset for a candidate or applicant. In some examples, the skillset data can include words that can be categorized into technical, business and behavioral skills. Thus, the skillset data can include technical words, business words and behavioral words. In some examples, the skillset data can include or characterize a predefined template. The synthetic data generator 206 can be programmed to populate with at least one skill (e.g., a technical skill) from a predefined list of words characterizing different skills, such as described herein. In some examples, the text data 216 can be provided by a user, such as via a keyboard and a mouse (e.g., at the input device 218).

The input device 218 can be any type of device capable of supporting a communications interface to the synthetic data generator 206, the candidate recommendation system 208 or the performance evaluator 210. Exemplary input devices 218 can include a server, a mobile device, a mobile computer, a tablet, etc. The input device 218 can be connected to the synthetic data generator 206, the candidate recommendation system 208 or the performance evaluator 210 using a provided network (e.g., via common internet protocols), such as a wired or wireless network. Example networks can include an Internet, an intranet, a WiFi network, a WiMAX network, a mobile telephone network, and combinations thereof. The input device 218 can be configured to enable a user to interact with the synthetic data generator 206, the candidate recommendation system 208 or the performance evaluator 210 via a local interface (e.g., a web browser, software application, etc.) to execute validation testing of the ML model 212 of the candidate recommendation system 208.

By way of example, the synthetic data generator 206 can be configured to receive the text data 216 and process the text data 216 to generate synthetic test data 220 for validating the performance of the ML model 212. In some examples, the synthetic test data 220 can characterize entity data that can include job requisition data, applicant data, candidate data, and/or hiring stage data. The synthetic data generator 206 can be configured to receive metadata 222 and populate at least some parameters of the job requisition data, applicant data, candidate data, and/or hiring stage data based on the metadata 222 to provide the synthetic test data 220. For example, the synthetic data generator 206 can be configured to populate a work experience parameter of the candidate and/or the applicant data. In some examples, the synthetic data generator 206 can be configured to populate a job requisition title parameter and/or job requisition description parameter of the job requisition data. Thus, the synthetic data generator 206 can be configured to generate the synthetic test data 220 based on the metadata 222, as described herein. In some examples, the metadata 22 can include parameter logic for populating at least a work experience parameter for a plurality of applicants and candidates and a job requisition parameter for a job requisition, as described herein.

In some examples, the work experience parameter, the job requisition title parameter, and/or the job requisition description parameter can be free text parameters. In such examples, a data driver 224 of the synthetic data generator 206 can be programmed to populate the work experience parameter, the job title parameter, and/or the job description parameter with text from the text data 216 according to the metadata 222. To populate these parameter fields, and in some examples other parameters of the job requisition data, the applicant data, the candidate data, and/or the hiring stage data, the data driver 224 can be programmed to identify corresponding portions of text from the text file characterized by the text data 304 and employ a weighting algorithm to identify a subset of words (e.g., individual words, select words, sentences, partial sentences, etc.) within the corresponding portions of text. In some examples, a data field generator 326 can be configured to populate at least a portion of the work experience parameter, the job requisition title parameter, and the job requisition description parameter.

By way of further example, the data driver 224 can be programmed to communicate with the data field generator 226. The data field generator 226 can be programmed to populate at least some of the parameters of the applicant data, the candidate data, the job requisition data, and/or the hiring stage data to provide the synthetic data 314 for testing (e.g., validating) the performance of the ML model 212. Thus, in some examples, the data driver 224 can be programmed to populate some of the parameters of the applicant data, the candidate data, the job requisition data, and/or the hiring stage data, and the data field generator 226 can be programmed to populate at least some similar parameters and/or different parameters of the applicant data, the candidate data, the job requisition data, and/or the hiring stage data. In some examples, the data driver 224 can include the data field generator 226.

In some examples, the parameters populated by the data field generator 226 can include parameters of the synthetic test data 220 that do not include the work experience parameter, the job requisition title parameter and the job description parameter. In some examples, the data driver 224 can be programmed to control the data field generator 226 to populate the parameters of the applicant data, the candidate data, the job requisition data, and/or the hiring stage data based on the metadata 222. In other examples, the data driver 224 can be programmed to parse parameter control data of the metadata 222 and pass the parsed parameter control data to the data field generator 226 for population of the parameters of the applicant data, the candidate data, the job requisition data, and/or the hiring stage data by the data field generator 226 based on the parsed parameter control data. In other examples, the data driver 224 can be programmed to pass the metadata 222 to the data field generator 226 for population of the parameters of the applicant data, the candidate data, the job requisition data, and/or the hiring stage data by the data field generator 226 based on the metadata 222.

In some examples, the data field generator 226 can include a plurality of parameter data generators that can be employed for populating one or more respective parameters of the applicant data, the candidate data, the job requisition data, and/or the hiring stage data based on the metadata 222. The plurality of parameter data generators can include a candidate identifier (ID) generator that can be programmed to generate a candidate ID and an applicant ID based on the metadata 222. The candidate ID can be used (e.g., by the data driver 224) to populate a candidate ID parameter of the candidate data, and the applicant ID can be used (e.g., by the data driver 224) to populate an applicant ID parameter of the applicant data.

In further examples, the data field generator 226 can include a requisition ID generator that can be programmed to generate a requisition ID based on the metadata 222. The requisition ID can be used (e.g., by the data driver 224) to populate a requisition ID parameter of the job requisition data and/or the hiring stage data. In additional example, the data field generator 226 can include an applicant generator that can be programmed to receive requisition IDs generated for candidates and applicants and determine a distribution of candidates that are going to be applicants and candidates that are going to be only candidates based on the metadata 222. For each candidate, the applicant generator can be programmed to generate an applicant identifier ID that can be based on the candidate ID for the candidate and the requisition ID for the job requisition based on the metadata 222. The applicant identifier ID can be provided (e.g., by the data driver 224) as part of the synthetic test data 220.

In some examples, the data field generator 226 can include a hiring stage generator that can be programmed to determine a hiring stage ID that can be based on the candidate ID for the candidate and the requisition ID for the job requisition according to the metadata 222. In some examples, the hiring stage ID generated by the hiring stage generator can be used (e.g., by the data driver 224) to populate a hiring stage ID parameter of the hiring stage data. In additional examples, the data field generator 226 can include a work experience date generator that can be programmed to return a set of start and dates for population of a job end date parameter and a job start date parameter of the candidate and the applicant data based on the metadata 222. In some examples, the data field generator 226 can include a work experience title generator that can be programmed to return a job title for a given work experience based on the metadata 222. In some examples, the work experience title generator can be programmed to identify for each candidate or applicant a title for populating a job title parameter of the candidate and applicant data based on a dictionary title list characterizing a plurality of different titles according to the metadata 222.

By way of further example, the data field generator 226 can include a work experience summary generator that can be programmed to employ the data driver 224 to return a corresponding subset of words (e.g., an extract) of a given text (e.g., book or document) as work experience and populate the work experience parameter based on the text data 216 according to metadata 222. In some examples, the data field generator 226 can include a job requisition title generator that can be programmed to identify a given title from the dictionary title list based on the text being used for the job requisition data according to the metadata 222. The job requisition title generator can be programmed to provide the job requisition title for populating (e.g., by the data driver 224) a job requisition title parameter of the requisition data. In some examples, the data field generator 226 can include a job description generator that can be programmed to employ the data driver 224 to return a corresponding subset of words (e.g., an extract) of a given text (e.g., book or document) as the job description and populate the job description parameter based on the corresponding subset of words according to the metadata 222. The job description generator can be programmed to provide (e.g., by the data driver 224) the corresponding subset of words for populating the job description parameter of the requisition data. In even further examples, the data field generator 226 can include a status type generator that can be programmed to identify a given type out of three types for each candidate: internal, external or external-internal based on the metadata 222. The status type generator can be programmed to return the given type for populating a status type parameter of the candidate and applicant data based on the metadata 222. In some examples, the status type generator can be programmed to return the status type for populating a target parameter of the requisition data.

In some examples, the data field generator 226 can be programmed to include a location generator. The location generator can be programmed to return a given city and corresponding state for each applicant and/or candidate based on the metadata 222. In some examples, the location generator can be programmed to determine latitude and longitude coordinates for each city based on the metadata 222. The location generator can be programmed to return the latitude and longitude coordinates for each city for each applicant and/or candidate. The returned latitude and longitude coordinates can be used to populate (e.g., by the data driver 224) latitude and longitude parameters of the candidate and/or applicant data. In some examples, the location generator can be programmed to return latitude and longitude coordinates for populating the latitude and longitude coordinate parameters of the job requisition data. In further examples, the location generator can be programmed to generate a true (e.g., 1) or false (e.g., 0) value indicative of whether the candidate and/or applicant is willing to travel based on the metadata 222. The location generator can be programmed to return the true or false value and a willingness of the candidate and/or applicant to travel parameter of the candidate and/or applicant data can be populated (e.g., by the data driver 224). In some examples, the location generator can be programmed to generate a true (e.g., 1) or false (e.g., 0) value indicative of whether the candidate and/or applicant is willing to relocate based on the metadata 222. The location generator can be programmed to return the true or false value and a willingness of the candidate and/or applicant to relocate parameter of the candidate and/or applicant data can be populated (e.g., by the data driver 224). The location generator can further be programmed to generate a true (e.g., 1) or false (e.g., 0) value indicative of a terminal state based on the metadata 222. The location generator can be programmed to return the true or false value and a terminal state parameter of the hiring stage data can be populated with the true or false value (e.g., by the data driver 224). In some examples, population of the parameters of the applicant data, the candidate data, the job requisition data and/or the hiring stage data can be implemented by the data driver 224. In other examples, at least some of the parameters can be populated by the data field generator 226 or the data field generator 226 can be programmed to pass values to the data driver 224 for populating the at least some of the parameters. By way of further example, the data field generator 226 can be programmed to control a distribution of content in at least some of the fields (e.g., parameters) of the synthetic test data 220 based on the metadata 222. Thus, in some examples, the metadata 222 can control distribution of data within at least some of the parameters defining (e.g., form parting of) the applicant data, the candidate data, the job requisition data and/or the hiring stage data. Thus, the data field generator 226 can be configured based on the metadata 222 to distribute the content to respective fields (e.g., parameters), as described herein.

Continuing with the example of FIG. 2, the synthetic data generator 206, in some examples, can be programmed to generate the synthetic test data 220 having a plurality of instances of candidate data and/or applicant data based on the metadata 222. In some examples, subsets of the plurality instances of the generated datasets can be provided based on a similar text of the plurality of texts according to the metadata 222. For example, first candidate data and the job requisition data can be generated by the synthetic data generator 206 based on a given text of the plurality of texts. Thus, at least a portion of the work experience parameter of the first candidate data and the job requisition title parameter and the job requisition description parameter of the job requisition data can be based on corresponding portions of the given text. By way of example, the work experience parameter of the first candidate data can include a subset of words from a portion of the given text identified by the synthetic test generator 206 and the job requisition title parameter and the job requisition description parameter can include a subset of words identified by the generator 206 from different portions of the given text than the portion used for the first candidate data.

For example, if the text is Alice in Wonderland, the work experience parameter can include the subset of words from at least one paragraph of Alice in Wonderland, and the job requisition title parameter and the job requisition description parameter can include the subset of words from at least one different paragraph of Alice in Wonderland. As explained herein, the subset of words can be identified by the data driver 224 by employing the weighting algorithm (e.g., a term frequency-inverse document (TF-IDF) algorithm). The synthetic data generator 206 can be programmed to generate a plurality of instances of candidate data based on a corresponding text, wherein one instance of the candidate data (e.g., the first candidate data) can be provided to have a work experience parameter that can be generated from a similar text as the requisition title parameter and/or the job requisition description parameter of the job requisition data.

In some examples, the synthetic data generator 206 can be programmed to generate a plurality of instances of the applicant data based on a corresponding text, wherein one instance of the applicant data (e.g., a first applicant data) can be provided to have a work experience parameter that can be generated from a similar text as the requisition title parameter and/or the job requisition description parameter of the job requisition data. For example, the plurality of instances of the applicant data can include the first applicant data that can include a work experience parameter that has been populated with a subset of words from a first text (e.g., Alice in Wonderland), second applicant data that can include a work experience parameter that has been populated with a subset of words from a second text (e.g., Dracula), third applicant data that can include a work experience parameter that has been populated with a subset of words from a third text (e.g., Huckleberry Finn), etc. As described herein, in some examples, the requisition title parameter and/or the job requisition description parameter of the job requisition data can be populated with a subset of words from one of the first text, the second text, etc. Thus, the synthetic test data 220 can characterize a plurality of instances of applicant data and/or candidate data wherein at least one instance of the applicant data or the candidate data can include a work experience parameter that has been populated with a subset of words from a similar text (e.g., Alice in Wonderland) as the requisition title parameter and/or the job requisition description parameter, however, from different portions of the text.

By way of further example, the synthetic data generator 206 can be programmed to apply the synthetic test data 220 to the ML model 212 to validate the performance of the ML model 212. The ML model 212 can be programmed to generate a prediction 228. In some examples, the ML model 212 is a ranking module, such as LTOR model. Thus, in some examples, the prediction 228 is a ranked candidate list. As an example, the ranked candidate list can provide a ranking of applicants or candidates relative to the job requisition. The ranked candidate list can be provided to the performance evaluator 210 to evaluate the performance of the ML model 212. In some examples, the performance evaluator 210 can include predicted performance data 230 characterizing a predicted performance of the ML model 212. In some examples, the predicted performance data 230 can characterize a predicted ranking quality of the ML model 212. The term "ranking quality," as used herein, can refer to a value (e.g., a number, a probability distribution, etc.) that can correspond to a measure of performance for a given ranking order that can be provided by a ML model. The predicted performance data 230 can be associated with an initial set of training parameters that were used to train the ML model 212 based on non-industry relevant training data. Various techniques can be employed to determine the initial set of training parameters. Example techniques can include searching across a training parameter space that includes a number of possible training parameter values using search techniques, such as an exhaust search, a random search, a grid search or a Bayesian-Gaussian search. Other techniques can be employed to determine the initial set of training parameters.

By way of further example, the performance evaluator 210 can be programmed to evaluate the ranked candidate list to determine a ranking quality for the ranked candidate list. In some examples, an area under a receiver operating characteristic curve (AUC) technique can be employed by the performance evaluator 210 based on the ranked candidate list to provide a measure of classification performance for the ML model 212. An AUC measure can provide an aggregate measure of performance across all possible classification thresholds for the ML model 212. AUC can range in value from 0 to 1. A model whose predictions are 100% wrong has an AUC of 0.0; one whose predictions are 100% correct has an AUC of 1.0. Thus, AUC can be employed by the performance evaluator 210 to provide a measure of how well predictions (e.g., the prediction 228) are ranked by the ML model 212.

In other examples, a discounted cumulative gain (DCG) measure can be implemented by the performance evaluator 210. DCG can measure the effectiveness of the ML model 212 by analyzing returned results (e.g., the ranked candidate list) against a graded relevance scale of content items in a search engine result set. DCG measures the usefulness, or gain, of a content item based on its position in the result list. The gain is accumulated from the top of the result list to the bottom with the gain of each result discounted at lower ranks. In other examples, different measures can be implemented to determine the ranking effectiveness of the ML model 212.

The performance evaluator 210 can be programmed to compare the determined ranked quality for the prediction 228 (e.g., the ranked candidate list) to the predicted ranking quality. If the determined ranked quality is greater than or equal to the predicted ranking quality this can be indicative that the ML model 212 is valid. If the determined ranked quality is less than the predicted ranking quality this can be indicative that the ML model 212 is not valid (e.g., not behaving as expected). In some examples, the performance evaluator 210 can be programmed to generate validation result data characterizing whether the ML model 212 is valid or is not valid. The performance evaluator 210 can be programmed to provide the validation result data to an output device 232 for displaying thereon. In some examples, the output device 232 can be part of the input device 218 while in other examples the output device 232 is separate from the input device 218. The output device 232 can include one or more displays, such as a monitor, heads up display or virtual reality headset or goggles.

In some examples, the performance evaluator 210 can be programmed to employ a ML trainer 234 in response to determining that the ML model 212 is not valid. The ML trainer 234 can be programmed to trigger a corrective action (e.g., corrective measure), such as training (e.g., re-training, in some examples) of the ML model 212 using a new set of training parameters. For example, the ML trainer 234 can be programmed to train the ML model 212 using the new set of training parameters that can have been identified (e.g., determined) according to the techniques as described herein, such as the exhaust search, the random search, the grid search or the Bayesian-Gaussian search. In other examples, different techniques may be employed to identify the new set of training parameters. In some examples, the new set of training parameters can refer to any type of parameter used in an initial training of the ML model 212. As such, in some examples, the new set of training parameters can include hyperparameters (e.g., parameters that are not learned from the initial training of the ML model 212). Examples of hyperparameters can include training examples, a learning rate, a learning rate decrease rate, etc. In some examples, the hyperparameters can be feature-specific, such as a parameter that weighs a cost of adding a feature to the ML model 212.

In some examples, if the ML model 212 is implemented based on a deep learning algorithm, the hyperparameters can include a number of layers, a layer size, an activation function, etc. In further examples, if the ML model 212 is implemented as a support vector machine, the hyperparameters can include a soft margin constant, a regularization, etc. In some examples, if the ML model 212 is implemented as a random forest classifier, the hyperparameters can include a complexity (e.g., depth) of trees in a forest, number of predictors at each node when growing trees, etc. By way of further example, in response to identifying the new set of training parameters, the ML trainer 234 can be programmed to train the ML model 212. In response to training the ML model 212, the performance evaluator 210 can be programmed to communicate with the synthetic data generator 206 to re-test and thus validate the performance of the ML model 212 based on the synthetic test data 220.

Accordingly, by employing the synthetic test data 220 that is not from a similar data source as the training data (e.g., non-industry relevant training data) used for training the ML model 212, the performance of the ML model 212 can be more robustly tested and enable developers to predict the performance of the ML model 212 to confirm that the ML model 212 has a ranking quality that is within intended design parameters. By confirming the ranking quality of the ML model 212 before the ML model 212 is employed and trained based on industry relevant training data (e.g., training data that is different from the training data on which the ML model 212 was initially trained), the ML model 212 can provide better predictions than an ML model that has not been tested based on the synthetic test data 220 generated by the synthetic data generator 206.

Figure 3:
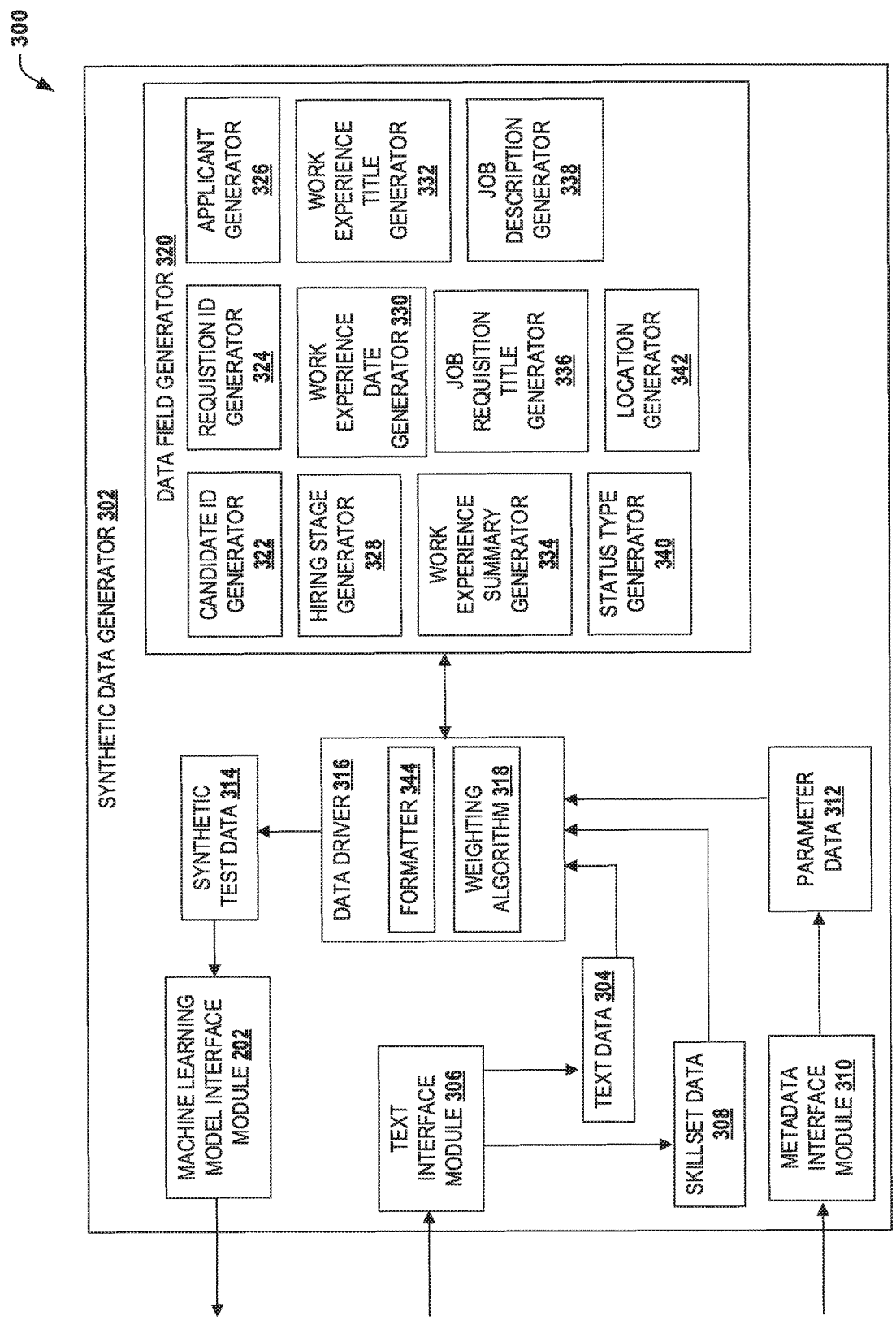
FIG. 3 illustrates an example of a synthetic data generator.
Figure 6:
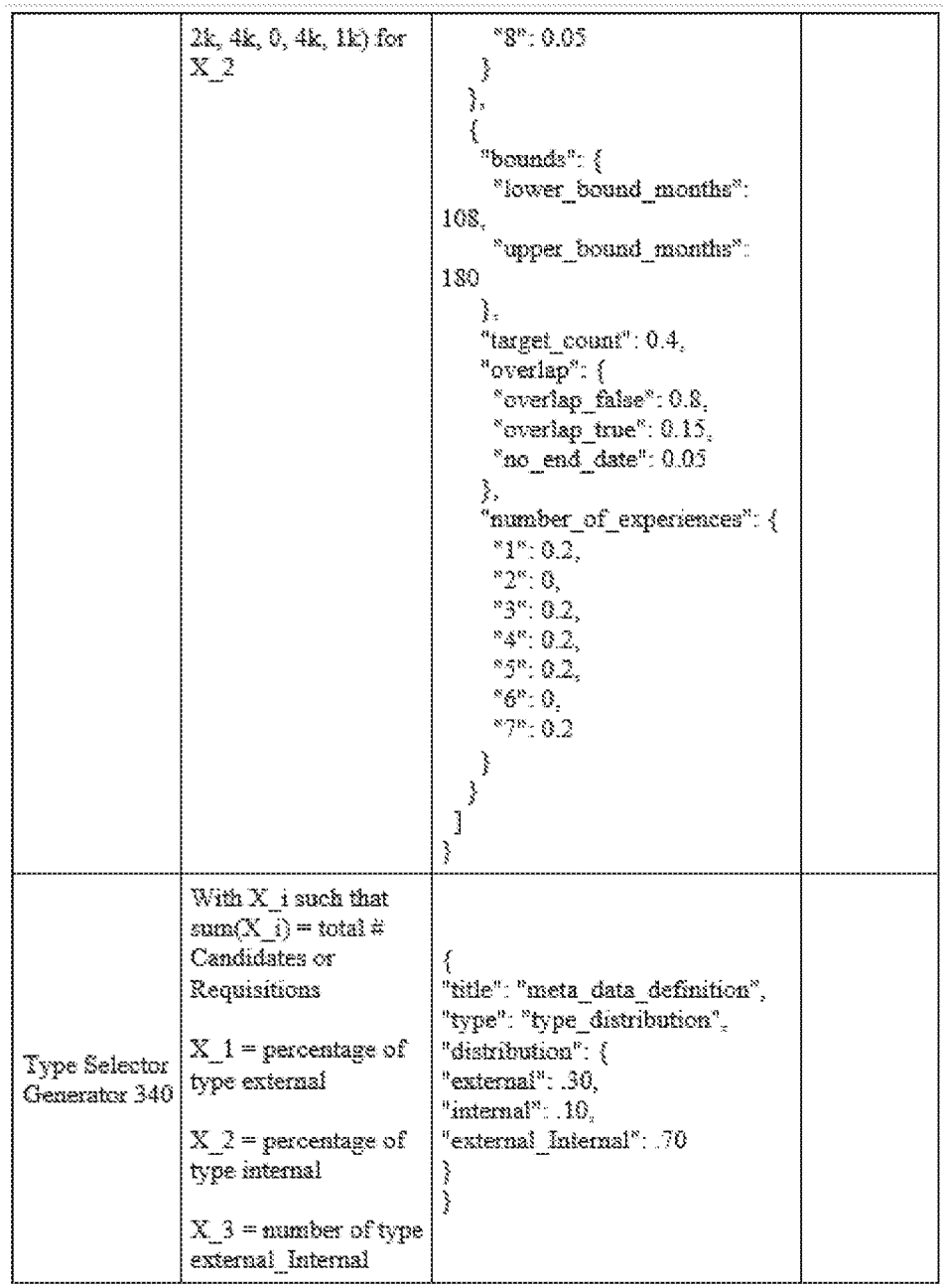
Figure 7:
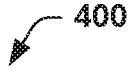
Figure 9:
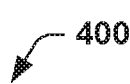

FIG. 3 illustrates an example environment 300 that includes a synthetic data generator 302. In some examples, the synthetic data generator 302 can correspond to the synthetic data generator 108, as illustrated in FIG. 1 or the synthetic data generator 202, as illustrated in FIG. 2. By way of example, the synthetic data generator 302 can be programmed to retrieve or receive text data 304 (e.g., from an input device, such as the input device 218, as illustrated in FIG. 2). In some examples, a text interface module 306 can be programmed to receive or retrieve the text data 304. The text data 304 can represent text from a different data source than training data used for training a machining learning (ML) model corresponding to a candidate recommendation model, such as the ML model 110, as illustrated in FIG. 1 or the ML model 212, as illustrated in FIG. 2. Thus, in some examples, the text data 304 can include text from a given data source, such as a set of books (e.g., Alice in Wonderland, Huckleberry Finn, Frankenstein, Dracula, A Christmas Carol, etc.). In contrast, the training data can include text from a different data source, such as industry relevant training data, for example, resume text, job description text, job requisition text, etc. In some examples, the text data 304 can characterize a plurality of different texts, such as a plurality of different books and can be referred to as a book dictionary. In further examples, the plurality of different texts can be represented as text files having a .txt file format. In some examples, the text data 304 can correspond to given text data from a text dataset that can include a plurality of different types of text data. In other examples, the text data 304 can correspond to the text data set. Thus, the text data 304 as described herein can be representative of a single text file or a data set that can include a plurality of text files.

In some examples, the synthetic data generator 302 can be programmed to retrieve or receive skillset data 308. By way of example, the text interface module 306 can be programmed to receive or retrieve the skillset data 308. The skillset data 308 can include a set of words, phrases, and/or sentences relating to a skillset for a candidate and/or applicant. In some examples, the skillset data 308 can include words that can be categorized into technical, business and behavioral skills. Thus, the skillset data 308 can include technical words, business words and behavioral words. In some examples, the skillset data 308 can include or characterize a predefined template. The synthetic data generator 302 can be programmed to populate with skills (e.g., a technical skill) from a predefined list of words that can be provided as input data to the synthetic data generator 302.

By way of further example, the synthetic data generator 302 can include a metadata interface module 310. The metadata interface module 310 can be programmed to receive or retrieve parameter data 312. In some examples, the parameter data 312 can correspond to the metadata 222, as illustrated in FIG. 2. The parameter data 312 can be configured to control generation of synthetic test data 314 for testing of the ML model to validate a performance of the ML model, as described herein. In some examples, the synthetic test data 314 can correspond to the synthetic test data 220, as illustrated in FIG. 2. The metadata interface module 310 can be programmed to provide the parameter data 312 to a data driver 316 for generation of the synthetic test data 314. In some examples, the parameter data 312 can include parameter logic for populating at least a work experience parameter for a plurality of applicants and candidates and a job requisition parameter for a job requisition, as described herein.

In some examples, the synthetic test data 314 can characterize entity data that can include job requisition data, applicant data, candidate data, and/or hiring stage data. The applicant data can include a candidate identifier (ID) parameter, a requisition ID parameter, a work experience parameter (e.g., a summary parameter, a job title parameter, an employer name parameter, a job function parameter, a job responsibility parameter, etc.), a job start date parameter, a job end date parameter, a recommendation flag parameter (e.g., set to true), an entity status parameter (e.g., set to active), a status type parameter, a latitude and longitude coordinate parameter, a city name parameter, a state name parameter, a country name parameter, a willingness of an applicant to travel parameter, a willingness of an applicant to relocate parameter, and an embedding parameter that can be generated based on work experience and title parameters. In some examples, the candidate data can include similar parameters as the applicant data and employ a different requisition ID. By utilizing a different requisition ID within the candidate data, candidates can be differentiated from applicants by the synthetic data generator 302.

In additional examples, rules and validations can be associated with or included in the candidate or applicant data for processing of the synthetic data 314 at the ML model. For example, the rules and validations can include removing applicants based on a given hiring stage or applicants that have already applied for a particular job. By way of further example, the job requisition data of the synthetic test data 314 can include a requisition ID parameter, a job requisition title parameter, a job requisition description parameter, a recommendation flag parameter (e.g., set to true), a target parameter, an entity status parameter (e.g., set to active) and a latitude and longitude coordinate parameter. The hiring stage data can include a requisition ID parameter (e.g., an existing requisition ID parameter), a candidate ID parameter (e.g., an existing candidate ID parameter), a hiring stage ID parameter, an entity status parameter (e.g., set to active), a terminal state parameter, and a hiring stage parameter.

In some examples, the work experience parameter, the job requisition title parameter, and the job requisition description parameter can be free text parameters. In such examples, the data driver 316 can be programmed to populate the work experience parameter, the job title parameter, and the job description parameter with text from the text data 304 and the skillset data 308 according to the parameter data 312. To populate these parameter fields, the data driver 316 can be programmed to identify corresponding portions of text from a given text characterized by the text data 304 and employ a weighting algorithm 318 to identify unique words within the corresponding portions of the given text. In some examples, the weighting algorithm 318 can correspond a numerical statistical algorithm that can be used to reflect an importance of a word among a set of words. In some examples, a data field generator 320 of the synthetic data generator 302 can be configured to populate at least a portion of the work experience parameter, the job requisition title parameter, and the job requisition description parameter. The data field generator 320 can correspond to the data field generator 226, as illustrated in FIG. 2.

By way of example, the weighting algorithm 318 can be implemented as a term frequency-inverse document (TF-IDF) algorithm. In other examples, a different type of weighting algorithm can be employed for identifying unique words in the corresponding portions of the given text. In response to identifying the words that are unique to each corresponding portion of the given text (e.g., of a book), the data driver 316 can be programmed to populate the work experience parameter with a subset of words (e.g., the unique words) from a corresponding section of the given text and populate the job requisition title parameter and the job requisition description parameter with a subset of words from a different section of the given text.

As an example, if each text characterizes a different book (e.g., Alice in Wonderland), at least one paragraph from each book can be evaluated by the weighting algorithm 318 to identify a subset of words from the at least one paragraph and another subset of words from at least one different paragraph of each book. Respective subset of words from each of the at least one paragraphs of each book can be used by the weighting algorithm 318 to populate the work experience parameter for corresponding candidates and applicants and the job requisition title and job requisition description parameters for a corresponding job requisition. In additional or other examples, the data driver 316 can be programmed to utilize the skillset data 308 to populate the work experience parameter and the job requisition title and job requisition description parameters with technical, business or behavioral words. Thus, in some examples, the subset of words can correspond to skillset words.

By way of further example, the data driver 316 can be programmed to communicate with the data field generator 320. The data field generator 320 can be programmed to populate parameters (e.g., as described herein) such as for defining (e.g., form of) the applicant data, the candidate data, the job requisition data, and/or the hiring stage data to provide the synthetic data 314 for testing (e.g., validating). In some examples, the populated parameters can include parameters of the synthetic data 314 that do not include the work experience parameter, the job requisition title parameter and the job description parameter. In some examples, the data driver 316 can be programmed to control the data field generator 320 to populate the parameters of the applicant data, the candidate data, the job requisition data, and/or the hiring stage data based on the parameter data 312. In other examples, the data driver 316 can be programmed to parse parameter control data of the parameter data 312 and pass the parsed parameter control data to the data field generator 320 for population of the parameters of the applicant data, the candidate data, the job requisition data, and/or the hiring stage data by the data driver 316 based on the parsed parameter control data. In other examples, the data driver 316 can be programmed to pass the parameter data 312 to the random field generator 320 for population by the generator 320 of the parameters of the applicant data, the candidate data, the job requisition data, and/or the hiring stage data.

As illustrated in FIG. 3, in some examples, the data field generator 320 can include a plurality of parameter data generators 322-342 that can be employed for populating the parameters that can define the applicant data, the candidate data, the job requisition data, and/or the hiring stage data based on the parameter data 312. For example, the data field generator 320 can include a candidate ID generator 322. The candidate ID generator 322 can be programmed generate a candidate ID that specifies that the work experience parameter has been populated with a subset of words from the text data 304, from which the text that the subset of words are from, and an associated epoch. For example, the candidate ID generator 322 can be programmed to generate the following ID: 031525816155, wherein 0 at a most significant number value (MSNV) can indicate that the work experience parameter includes text from the text data 304, 3 indicates which text (e.g., book) the subset of words populating the work experience parameter were retrieved from, and 1525816155 is an epoch. In other examples, the candidate ID generator 322 can be programmed generate a candidate ID that specifies that the work experience parameter has been populated with a subset of words from the skillset data 308, and an associated epoch. For example, the candidate ID generator 322 can be programmed to generate the following ID: 11525816159, wherein 1 at the MSNV can indicate that the subset of words populating the work experience parameter are from the skillset data 308, and 1525816159 is an epoch. In some examples, the candidate ID generator 322 can be programmed to generate an applicant ID in a same or similar manner as described above. The candidate ID generated by the candidate ID generator 322 can be used to populate the candidate ID parameter for the candidate data. In some examples, the applicant ID generated by the candidate ID generator 322 can be used to populate the applicant ID parameter for the applicant data.

In some examples, the data field generator 320 can include a requisition ID generator 324. The requisition ID generator 324 can be programmed generate a requisition ID that can specify that the job requisition title and job requisition description parameters have been populated with a subset of words from the text data 304, from which text the subset of words are from, and an associated epoch. For example, the requisition ID generator 324 can be programmed to generate the following ID: 031525816155, wherein 0 at a MSNV can indicate that the job requisition title and job requisition description parameters include text from the text data 304, a value located to a right of the MSNV, such as 3 in the generated ID can indicate which text (e.g., book) the subset of words populating the work experience parameter were retrieved from, and 1525816155 is an epoch. In other examples, the requisition ID generator 324 can be programmed generate a requisition ID that can specify that the job requisition title and job requisition description parameters has been populated with a subset of words from the skillset data 308 and an associated epoch. For example, the requisition ID generator 324 can be programmed to generate the following ID: 11525816159, wherein 1 at the MSNV can indicate that a subset of words populating the job requisition title and job requisition description parameters are from the skillset data 308, and 1525816159 is an epoch. In some examples, the requisition ID generated by the requisition ID generator 324 can be used to populate the requisition ID parameter for the job requisition data and/or the hiring stage data.

In some examples, the data field generator 320 can include an applicant generator 326. The applicant generator 326 can be programmed to receive requisition IDs generated for candidates and applicants (e.g., from the requisition ID generator 324) and determine a distribution of candidates that are going to be applicants and candidates that are going to be only candidates based on the parameter data 312. Thus, the applicant generator 326 can be programmed to determine how many different applicants can be created out of candidates and a distribution of applicants per a given job requisition based on the parameter data 312. For each candidate, the applicant generator 326 can be programmed to generate an applicant identifier ID that can be based on the candidate ID for the candidate and the requisition ID for the job requisition according to the parameter data 312. The applicant identifier ID can be provided as part of the synthetic data 314.

In further examples, the data field generator 320 can include a hiring stage generator 328. The hiring stage generator 328 can be programmed to determine a distribution of how many applicants have already rejected an offer, how many have been rejected without an offer and how many are in a different hiring stage (e.g., in progress) for a given job based on the parameter data 312. For each candidate, the hiring stage generator 328 can be programmed to return a hiring stage ID that can be based on the candidate ID for the candidate and the requisition ID for the job requisition according to the parameter data 312. In some examples, the hiring stage ID generated by the hiring stage generator 328 can be used to populate the hiring stage ID parameter for the hiring stage data.

In some examples, the data field generator 320 can include a work experience date generator 330. The work experience date generator 330 can be programmed to define how many experiences that a candidate can have, and for each experience being generated, determine if the experience is going to overlap, be an open-ended experience, or neither based on the parameter data 312. Thus, the work experience date generator 330 can be programmed to populate the job end date parameter and the job start date parameter for the candidate and/or the applicant data. In some examples, a limit for a last job end date can be a current date. In additional or alternative examples, not all the candidates can have a work experience that can end in a given month (e.g., people unemployed for more than a year). In some examples, job end and starts dates associated with work experience can be in a Year/Month format. In other examples, a different format can be employed wherein a first of the month is used for the job start date and a last of the month for the job end date. Each range of dates or job start dates (e.g., for open-ended) can be in a progressive fashion. Thus, in some examples, overlap can exist.

In some examples, the work experience date generator 330 can be programmed to determine a distribution of how many candidates have a minimum experience (e.g., 1 to 3 years), a medium experience (e.g., 3 to 8 years) and a long experience (e.g., 8 to 15 years) based on the parameter data 312. In some examples, the work experience date generator 330 can be programmed to determine a distribution of a number of experiences for a range based on the parameter data 312. In even further examples, the work experience date generator 330 can be programmed to determine a distribution of a number of open-ended, only start date, and not end date based on the parameter data 312. Accordingly, the work experience date generator 330 can be programmed to return a set of start and dates for population of the job end date parameter and the job start date parameter for the candidate and/or the applicant data.

In some examples, the data field generator 320 can include a work experience title generator 332. The work experience title generator 332 can be programmed to return a job title for a given work experience based on the parameter data 312. In some examples, the work experience title generator 332 can be programmed to receive the text data 304 and extract a given number of words in each text (e.g., each book or document). In an example, the extracted given number of words can correspond to a subset of words identified by the weighting algorithm 318. The work experience title generator 332 can further be programmed to combine the extracted words with common position data characterizing common position names, such as Senior, VP, Junior, Intern, Director, Manager, Assistant, etc. to generate a dictionary containing a list of job titles based on the parameter data 312. The work experience title generator 332 can be programmed to identify for each candidate or applicant a title for populating the job title parameter for the candidate and applicant data based on the generated dictionary according to the parameter data 312.

In some examples, the data field generator 320 can include a work experience summary generator 334. The work experience summary generator 334 can be programmed to employ the data driver 316 to return a corresponding subset of words (e.g., an extract) of a given text (e.g., book or document) as work experience and populate the work experience parameter based on the text data 304 according to the parameter data 312. In some examples, the data field generator 320 can be programmed to employ the weighting algorithm 318 to return the subset of words based on the text data 304 according to the parameter data 312.

In even further examples, the data field generator 320 can include a job requisition title generator 336. The job requisition title generator 336 can be programmed to identify a given title from the dictionary containing the list of job titles according to the parameter data 312. The job requisition title generator 336 can be programmed to provide the job requisition title for populating the job requisition title parameter of the requisition data. In some examples, the data field generator 320 can include a job description generator 338. The job description generator 338 can be programmed to employ the data driver 316 to return a corresponding subset of words (e.g., an extract) of a given text (e.g., book or document) as the job description and populate the job description parameter based on the text data 304 according to the parameter data 312. In some examples, the job description generator 338 can be programmed to employ the weighting algorithm 318 to return the subset of words based on the text data 304. The job description generator 338 can be programmed to provide the job description for populating the job description parameter of the requisition data.

In even further examples, the data field generator 320 can be programmed to include a status type generator 340. The status type generator 340 can be programmed to identify a given status type out of three possible types for each candidate: internal, external or external-internal. The status type generator 340 can be programmed to determine a distribution of how many candidates are internal, external or external-internal based on the parameter data 312. In some examples, the status type generator 340 can be programmed to determine how many requisitions are from each possible location based on the parameter data 312. The status type generator 340 can be programmed to return a status type for populating the status type parameter for the candidate and/or applicant data. In some examples, the status type generator 340 can be programmed to return the status type for populating the target parameter for the requisition data.

In some examples, the data field generator 320 can be programmed to include a location generator 342. The location generator 342 can be programmed to create a location dictionary that can include cities and corresponding states based on the parameter data 312. The location generator 342 can be programmed to return a given city and corresponding state for each applicant and/or candidate. The returned given city and the corresponding state can be used to populate the city and state parameters for the candidate and/or applicant data. In some examples, the location generator 342 can be programmed to determine a distribution of how many candidates are from each possible location based on the metadata data 312. In further or alternative examples, the location generator 342 can be programmed to determine a distribution of how many requisitions are from each possible location based on the parameter data 312.

By way of further example, the location generator 342 can be programmed to determine latitude and longitude coordinates for each city based on the metadata data 312. In some examples, the location generator 342 can be programmed to determine a distribution of how many candidates should be close to, away, and farther away from the city based on the parameter data 312. In further or alternative examples, the location generator 342 can be programmed to generate information indicative if the candidate is willing to relocate based on the parameter data 312. The location generator 342 can be programmed to return the latitude and longitude coordinates for each city for each applicant and/or candidate.

The returned latitude and longitude coordinates can be used to populate the latitude and longitude parameters for the candidate and/or applicant data. In some examples, the location generator 342 can be programmed to return the latitude and longitude coordinates for the job requisition data and the latitude and longitude coordinate parameters therein can be populated.

In further examples, the location generator 342 can be programmed to generate a true (e.g., 1) or false (e.g., 0) value indicative of whether the candidate and/or applicant is willing to travel based on the parameter data 312. In some examples, the location generator 342 can be programmed to determine a distribution of how many candidates are willing to travel and employ the distribution to generate for each candidate and/or applicant the true or false value indicating whether the candidate or the applicant is willing to travel based on the parameter data 312. The location generator 342 can be programmed to return the true or false value and populate the willingness of the candidate and/or applicant to travel parameter for the candidate and/or applicant data.

In some examples, the location generator 342 can be programmed to generate a true (e.g., 1) or false (e.g., 0) value indicative of whether the candidate and/or applicant is willing to relocate based on the parameter data 312. In an example, the location generator 342 can be programmed to determine a distribution of how many candidates and/or applicants are willing to relocate and employ the distribution to generate for each candidate and/or applicant the true or false value indicating whether the candidate and/or the applicant is willing to relocate based on the parameter data 312. The location generator 342 can be programmed to return the true or false value and populate the willingness of the candidate and/or applicant to relocate parameter for the candidate and/or applicant data. In some examples, the location generator 342 can be programmed to generate a true (e.g., 1) or false (e.g., 0) value indicative of a terminal state based on the parameter data 312. In an example, the location generator 342 can be programmed to determine a distribution of how many applicants have already rejected the offer, how many have been rejected without an offer and/or how many are in a different stage (e.g., in progress) based on the parameter data 312. The location generator 342 can be programmed to return the true or false value and the terminal state parameter of the hiring stage data can be populated with the true or false value. In some examples, population of the parameters for the applicant data, the candidate data, the job requisition data and/or the hiring stage data can be implemented by the data driver module 316. In other examples, the data field generator 320 can be programmed to populate the parameters.

By way of further example, at least some of the plurality of parameter data generators 322-342 can be programmed to control a distribution of content in at least some of the fields (e.g., parameters) of the synthetic data 314 based on the parameter data 312. Thus, in some examples, the parameter data 312 can control distribution of data within parameters for the applicant data, the candidate data, the job requisition data and/or the hiring stage data. At least some of the plurality of parameter data generators 322-342 can be configured based on the parameter data 312 to distribute the content to respective fields (e.g., parameters), as described herein. FIGS. 4-9 illustrate an example of a table 400 identifying parameter data generators of the data field generator 300, respective distribution logic and JavaScript Object Notation (JSON) code for implementing the respective distribution logic. In other examples, a different open-standard file format can be employed than JSON, which can be an open or closed standard to implement the respective distribution logic. Each of the parameter data generators identified in the example table 400 can be configured to distribute content in corresponding fields based on the parameter data 312.

In some examples, the parameter data 312 can include configuration metadata. The configuration metadata can be employed to control the data driver 316 and the data field generator 320 for generation of the synthetic test data 314. For example, the configuration metadata can include a candidate application distribution parameter to control the distribution of the content of fields for applicants and/or candidates. For applicants, the configuration metadata can provide a set of key/value pairs that can enable determining how many applications an applicant can apply to. The value can be a float number that can represent a percentage. A sum of the percentages can sum up to 1.0. In some examples, for applicants and candidates, the configuration metadata can specify for the willing to relocate parameter a percentage of the applicants and/or candidates that can have this field set to a given value (e.g., true). This can be a number between 0.0-1.0. In some examples, for applicants and candidates, the configuration metadata can specify for the willing to travel parameter a percentage of applicants and/or candidates that can have this field set to a given value (e.g., true). This can be a number between 0.0-1.0.

In some examples, the configuration metadata can specify or control the distribution of information related to years of experience that can be used in job requisition descriptions, candidates work experiences, as described herein. The configuration metadata can further include a list of bounds for ranges of years of experiences, including upper and lower bound months. The configuration metadata can specify a key/value set of how many experiences can a candidate or applicant have in a corresponding resume with the current bounds. The values can be floating values and a sum of all of the floating values can sum up to 1.0. The configuration metadata can control if the work experiences in a candidate or applicant can overlap according to a given percentage. A sum of the percentages can sum up to 1.0. The configuration metadata can provide a float number specifying a percentage of how many records can use the current bounds of experiences. This can be used in the generation of data for requisition, candidates and applicants. In further examples, the configuration metadata can define a set of state codes in a current phase of a hiring stage and a phase name of a current phase. The configuration metadata can further specify a number of hiring stages in a job requisition.

In some examples, the configuration metadata can specify data related to locations for requisitions, candidates and applicants. For example, the configuration metadata can specify a list of cities to use, this list can have a number of cities, and a sum of all of the target percentages can sum up to 1.0. Thus, the configuration metadata file can specify the name of the city to use, and a target percentage (e.g., a percentage of how many records can use this city, which can apply to requisitions, candidates and applicants). In some examples, the configuration metadata can specify a list of distances that determine how far away from a pivot city should an applicant or candidate reside. This list can have as many records as needed that can sum up to a percentage up to 1.0. The configuration metadata can identify lower and upper bounds for the list of distances, and a target percentage of how many records can use this range of distance, such as with respect to candidates and applicants.

In further examples, the configuration metadata can specify how many locations a job requisition can have. A list can be provided specifying a percentage of jobs requisitions to have one location, two locations, three locations, etc. The sum of the percentages can add up to 1.0. In some examples, the configuration metadata can specify how many templates can be created by providing a list. The list can include a behavioral parameter specifying how many requisitions, applicants and candidates that can be created from the templates that can have behavioral skills, a business parameter specifying how many requisitions, applicants and candidates that can be created from templates that can have business skills, and a technical parameter specifying how many requisitions, applicants and candidates that can be created from templates that can have technical skills. The sum of all parameters can be represented as a percentage that can sum up to 1.0.

In even further examples, the configuration metadata can specify a distribution (e.g., percentage) of how many records can be generated from templates (e.g., skills) or text (e.g., books). The percentages with respect to each of the text and skill distribution can sum up to 1. For example, with respect to candidate distribution, the candidate distribution can include text and skill distribution. In some examples, the job requisition distribution can include text and skill distributions. By way of further example, the configuration metadata can include a status type specifying a distribution for target and type parameters for requisitions, candidates or applicants, respectively. The sum of all of the percentages can add up to 1.0 with respect to the target and type parameters. By way of example, FIGS. 10-13 illustrates an example of configuration metadata 1000. The configuration metadata 1000 can correspond to the configuration metadata defining (e.g., forming) part of the parameter data 312, as described herein with respect to FIG. 3.

In some examples, the data driver 316 can be programmed to provide hiring stages as described herein to model phases through which an applicant can go through. In other examples, the data field generator 320 can be programmed to provide the hiring stages. An application is the action of having an applicant apply to a specific job requisition. In some examples, the hiring stage data can be generated by the data driver 316 that can have a number of fields, such as described herein. For example, the hiring stage data can include the requisition ID parameter for an existing job requisition, the candidate ID parameter for an existing applicant, a hiring stage ID parameter that is unique for a particular hiring stage, an entity status parameter that can be a hard-coded field that can always contain a given string (e.g., ACTIVE), a terminal state parameter having a value that can depend on a state code (e.g., this parameter can show whether there can be no further progress beyond a current state, for example, in the context of candidate selection process there can be two terminal states: rejected_employer and withdrawn_by_candidate), a state code parameter which can have a value for the current state (e.g., at least some of the phases can contain rejected_employer and withdrawn_by_candidate in a corresponding state), and a phase code parameter which can have a value for the current phase that is being modeled by the data driver 316 for the hiring stage. In some examples, a number of hiring stages can be an integer that can be user definable or provided by the data driver 316.

In some examples, the parameter data 312 can include hiring stage modeling code for the hiring stage modeling. The data driver 316 can be configured based on the hiring stage modeling code to take a list of an arbitrary length (e.g., a code could support many phases) with a distribution of what and how many states each phase can have. By modeling the phase of the hiring stage as a list, a phasing order can be preserved, and enable a user to define custom states for each of the phases. FIG. 14 illustrates an example of hiring stage modeling code 1400. The hiring stage modeling code 1400 can correspond to the hiring stage modeling code forming (e.g., defining) part of the parameter data 312.

In even further examples, as described herein, the parameter data 312 can include template wording metadata. The template wording metadata can specify a wording of templates and a location of each template through template location information. As presented herein, in some examples, the skillset data 308 can be generated based on a pre-defined template. In some examples, the pre-defined templates can be used to generate job requisition description and work experience descriptions for the candidates and applicants. FIG. 15 illustrates an example of a pre-defined template 1500. The pre-defined template 1500 can be employed to provide the skillset data 308, in some examples, as described herein.

In some examples, the data driver 316 can be configured to output the applicant data, the candidate data, the job requisition data and the hiring stage data as grouped and ungrouped data to provide the synthetic data 314. The data driver 316 can be configured to implement grouping and ungrouping of the data based on ingesting characteristics of a candidate recommendation system (e.g., the candidate recommendation system 100, as illustrated in FIG. 1). Thus, in some examples, an individual file corresponding to data can be outputted for each of the applicant, the candidate, the job requisition, and the hiring stage. In other examples, respective files can be outputted, one for each of the candidate, the job requisition, and the hiring stage.

In some examples, in response to the data driver 316 being configured to output grouped data, a unique generation ID can be assigned to each dataset (e.g., file) to assist in identifying, classifying and differentiation different applications of the synthetic data 314 to the ML model. FIGS. 16-18 illustrates an example of job requisition data 1600 as ungrouped job requisition data. FIGS. 19-20 illustrates an example of job requisition data 1900 as grouped data. FIGS. 21-22 illustrates an example of applicant data 2100 as grouped data. FIG. 23 illustrate an example of applicant data 2300 as ungrouped data. FIG. 24 illustrates an example of candidate data 2400 as grouped data. FIG. 25 illustrates an example of candidate data 2500 as ungrouped data. FIG. 26 illustrates an example of hiring stage data 2600 as grouped data. FIG. 27 illustrates an example of hiring stage data 2700 as ungrouped data.

Continuing with the example of FIG. 3, the data driver 316 can be programmed to generate synthetic test data 314 that can include a plurality of instances of candidate data and applicant data based on the parameter data 312. In some examples, subsets of the plurality instances of the data can be generated on a similar text of the plurality of texts of the text data 304 based on the parameter data 312. For example, first candidate data and the job requisition data can be generated by the data driver 316 based on a given text of the plurality of texts. Thus, at least a portion of the work experience parameter of the first candidate data and the job requisition title parameter and the job requisition description parameter of the job requisition data can be based on corresponding portions of the given text. By way of example, the work experience parameter of the first candidate data can include a subset of words from a portion of the given text identified by the data driver 316 and the job requisition title parameter and the job requisition description parameter can include a subset of words identified by the data driver 316 from different portions of the given text than the portion used for the first candidate data.

For example, if the text is Alice in Wonderland, the work experience parameter can include the subset of words from at least one paragraph of Alice in Wonderland, and the requisition title parameter and/or the job requisition description parameter can include the subset of words from at least one different paragraph of Alice in Wonderland. As explained herein, the subset of words can be identified by the data driver 316 by employing the weighting algorithm 318 (e.g., a term frequency-inverse document (TF-IDF) algorithm). The data driver 316 can be programmed to generate a plurality of instances of candidate data based on a corresponding text, wherein one instance of the candidate data (e.g., the first candidate data) is provided having a work experience parameter that is generated from a similar text as the requisition title parameter and/or the job requisition description parameter of the job requisition data. The data driver 316 can be programmed to generate a plurality of instances of the applicant data based on a corresponding text, wherein one instance of the applicant data (e.g., a first applicant data) is provided having a work experience parameter that is generated from a similar text as the requisition title parameter and/or the job requisition description parameter of the job requisition data.

For example, the plurality of instances of the applicant data can include the first applicant data that can include a work experience parameter that has been populated with a subset of words from a first text (e.g., Alice in Wonderland), second applicant data that can include a work experience parameter that has been populated with a subset of words from a second text (e.g., Dracula), third applicant data that can include a work experience parameter that has been populated with a subset of words from a third text (e.g., Huckleberry Finn), etc. As described herein, in some examples, the requisition title parameter and/or the job requisition description parameter of the job requisition data can be populated with a subset of words from one of the first text, the second text, etc. Thus, the synthetic test data 314 can characterize a plurality of instances of applicant data and/or candidate data wherein at least one instance of the applicant data or the candidate data includes a work experience parameter that has been populated with a subset of words from a similar text (e.g., Alice in Wonderland).

In some examples, the data driver 316 can include a formatter 334. The formatter 334 can be configured to provide the synthetic test data 314 in a format that is compatible with the ML model. In some examples, the synthetic test data 314 can have an open-standard format or a closed-standard format. By way of example, the synthetic test data 314 can have an open-standard format, such as JSON, which uses human-readable text to transmit data objects consisting of attribute-value pairs and array data types (or any other serializable value). In other examples, the synthetic test data 314 can have a different file format. In some examples, the ML model can be implemented based on a Solr search engine, which is an open source enterprise search server based on the Lucene Java search library, with extensible markup language (XML) and HyperText Transfer Protocol (HTTP) and JSON application program interfaces (APIs), hit highlighting, faceted search, caching, replication, and web administration. The Solr search engine can run in a Java servlet container, such as Apache Tomcat.

The synthetic data generator 206 can be programmed to provide the synthetic test data 314 to the ML model to validate a performance of the ML model, such as described herein. Accordingly, by employing the synthetic test data 314 generated by the synthetic data generator 302 that is not from a similar data source as the training data (e.g., non-industry relevant training data) used for training the ML model, the performance of the ML model can be more robustly tested as the synthetic test data 314 enables developers to adjust a ML models performance prior to deployment in a particular industry. Thus, the ML models performance can be verified based on a different type of testing data than that used to train the ML model thereby enabling developers to confirm that the ML model at a greater accuracy that the ML model has a greater ranking quality than an ML model tested on a portion of data from the training data used to train the ML model.

Figure 28:
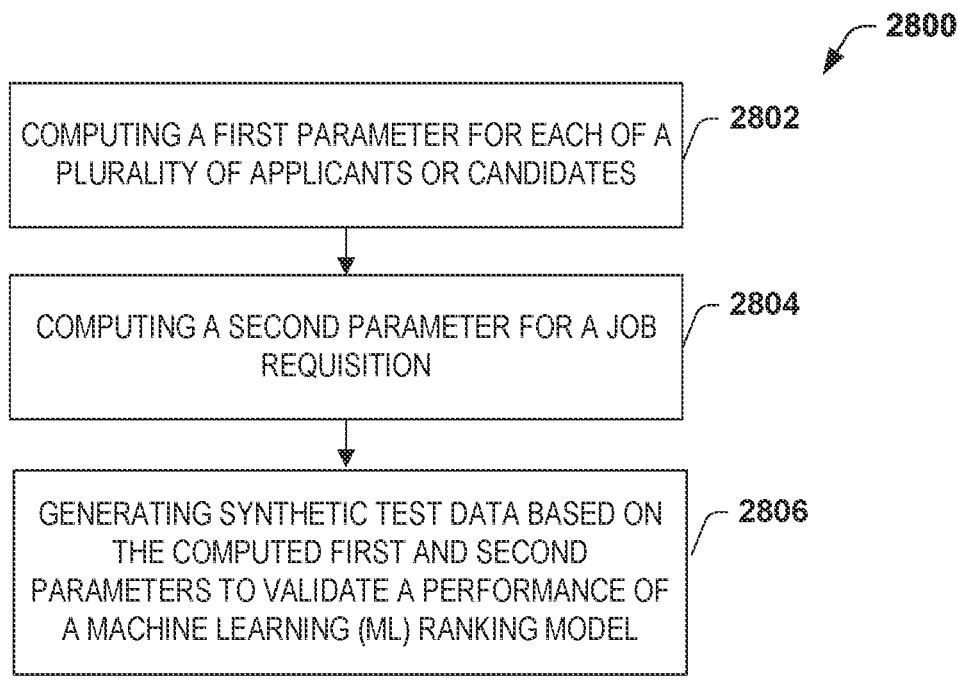
FIG. 28 illustrates an example of a computer implemented method for validating a candidate recommendation model.

In view of the foregoing structural and functional features described above, a method in accordance with various aspects of the present disclosure will be better appreciated with reference to FIG. 28. While, for purposes of simplicity of explanation, the method of FIG. 28 is shown and described as executing serially, it is to be understood and appreciated that the present disclosure is not limited by the illustrated order, as some aspects could, in accordance with the present disclosure, occur in different orders and/or concurrently with other aspects from that shown and described herein. Moreover, not all illustrated features can be required to implement a method in accordance with an aspect the present disclosure.

FIG. 28 illustrates an example of a computer implemented method 2800 for validating a machine learning (ML) ranking model. In some examples, the computer implemented method is implemented by a ML model validation system, such as the ML model validation system 102, as illustrated in FIG. 1. The computer implemented method 2800 can begin at 2802 by computing a first parameter (e.g., a work experience parameter) for each of a plurality of applicants or candidates based on respective text data from a text dataset that can include a plurality of different types of text data. The first parameter for each applicant or candidate can be computed by populating the first parameter with a given portion of text of the respective data. In some examples, the text dataset can correspond to the text data 214, as illustrated in FIG. 2 or the text data 304, as illustrated in FIG. 3. For example, the first parameter can be computed by a synthetic data generator 106, as illustrated in FIG. 1, the data synthetic data generator 206, as illustrated in FIG. 2 or the data synthetic data generator 308, as illustrated in FIG. 1.

At 2804, computing a second parameter (e.g., a job requisition parameter, such as a job description parameter and/or a job title parameter) for a job requisition based on the respective text data used to compute the first parameter for a given applicant or candidate of the plurality of applicants or candidates. The second parameter for the job requisition can be computed by populating the second parameter with a different portion of text of the respective data used to compute the first parameter for the given applicant or candidate. For example, the second parameter can be computed by the synthetic data generator 106, as illustrated in FIG. 1, the data synthetic data generator 206, as illustrated in FIG. 2 or the data synthetic data generator 308, as illustrated in FIG. 1. At 2806, generating synthetic test data based on the computed first and second parameters to test a machine learning (ML) ranking model trained on training data that is from a different data source than the text dataset to validate a performance of the ML ranking model. In some examples, the synthetic test data can correspond to the synthetic test data 220, as illustrated in FIG. 2 or the synthetic test data 314, as illustrated in FIG. 3.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A computer implemented method comprising:
    computing, by a synthetic data generator executing on one or more servers, a first parameter for a work experience for each of a plurality of applicants or candidates based on respective text data from a text dataset comprising a plurality of different types of text data that is extracted from a set of published books using a term frequency-inverse document (TF-IDF) algorithm, the first parameter for each applicant or candidate being computed by populating the first parameter with a given portion of text of the respective text data, wherein the first parameter is a free text parameter;
    computing a second parameter for a job requisition based on the respective text data used to compute the first parameter for a given applicant or candidate of the plurality of applicants or candidates, the second parameter for the job requisition being computed by populating the second parameter with a different portion of text of the respective text data used to compute the first parameter for the given applicant or candidate, wherein the second parameter is a free text parameter, the first parameter and the second parameter for a first applicant or candidate of the plurality of applicants or candidates are extracted from a first published book of the set of published books, and the first parameter and the second parameter for a second applicant or candidate of the plurality of applicants or candidates are extracted from a second published book of the set of published books; and
    computing a third parameter for one or more of work experience dates for each of the plurality of applicants or candidates with start and end dates, wherein the start and end dates selected for the plurality of applicants or candidates are distributed over a range defined in metadata;
    generating synthetic test data based on the computed first, second and third parameters to test a machine learning (ML) ranking model trained on training data that is from a different data source than the text dataset to validate a performance of the ML ranking model;
    evaluating, by a performance evaluation operating on the one or more computing platforms, a ranking list of the plurality of applicants or candidates characterized in the synthetic test data based on predicted performance data for the plurality of applicants or candidates to determine a prediction quality of the ML ranking model; and
    re-training, by the performance evaluator, the ML ranking model in response to the prediction of quality of the ML ranking model being below a threshold level, wherein the re- training comprises applying a new training data to the ML ranking model, the new training data including hyperparameters that were not included in the training data, and the hyperparameters adjust a learning process of the ML ranking model.

2. The computer implemented method of claim 1, further comprising receiving the metadata that includes parameter logic for populating the first parameter for each of plurality of applicants or candidates and the second parameter for the job requisition.

3. The computer implemented method of claim 2, further comprising:
    causing the synthetic test data to be applied to the ML ranking model, the ML ranking model being programmed to generate prediction data based on the synthetic test data.

4. The computer implemented method of clam 3, further comprising:
    causing the synthetic test data to be applied to the re-trained ML ranking model, the re-trained ML ranking model being programmed to generate new prediction data based on the synthetic test data; and
    evaluating the new prediction data relative to the predicted performance data to determine whether the re-trained ML ranking model is valid.

5. The computer implemented of claim 4, wherein the prediction data is a ranking list providing a ranking of each of the plurality of applicants or candidates relative to the job requisition.

6. The computer implemented method of claim 5, wherein the first parameter computed for each of the plurality of applicants or candidates is based on different text data from the dataset.

7. The computer-implemented method of claim 6, wherein the evaluating comprises determining that the re-trained ML ranking model is valid in response to determining that the given applicant or candidate for which similar text data was used to compute the first and second parameters has a greater ranking on the ranking list relative to other applicants or candidates of the plurality of applicants or candidates relative to job requisition.

8. The computer implemented method of claim 7, wherein the given portion of the text of the respective text data corresponds to a first subset of words and the different portion of the text of the respective text data corresponds to a second subset of words, wherein the first and second subset of words share at least one word.

9. A system comprising:
    memory to store machine readable instructions, a text dataset comprising a plurality of different types of text data extracted from a set of published books using a term frequency- inverse document (TF-IDF) algorithm, and metadata that includes parameter logic for populating at least a work experience parameter for a plurality of applicants or candidates, a job requisition parameter for a job requisition and one or more work experience date parameters for the plurality of applicants or candidates;
    one or more processors configured to access the memory and execute the machine readable instructions, the machine readable instructions comprising:
        a synthetic data generator programmed to:
            populate the work experience parameter with a given portion of text of respective text data from the text dataset based on the parameter logic, wherein the work experience parameter is a free text parameter computed for each of the plurality of applicants or candidates based on different text data from the dataset;

populate the job requisition parameter with a different portion of text of the respective text data used to compute the first parameter for a given applicant or candidate of the plurality of applicants or candidates, wherein the job requisition parameter is a free text parameter, the work experience parameter and the job requisition parameter for a first applicant or candidate of the plurality of applicants or candidates are extracted from a first published book of the set of published books and the work experience parameter and the job requisition parameter for a second applicant or candidate of the plurality of applicants or candidates are extracted from a second published book of the set of published books;

populating the one or more work experience date parameters for each of the plurality of applicants or candidates with start and end dates, wherein the start and end dates are selected for the plurality of applicants or candidates are distributed over a range defined in the metadata; and generate synthetic test data based on the computed work experience parameter and job requisition parameter to test a learning to rank (LTOR) model trained on training data that is from a different data source than the text dataset to validate a performance of the LTOR model; and a performance evaluator programmed to:
apply the synthetic test data to the LTOR model to cause the LTOR model to generate a ranking list to provide a ranking of each of the plurality of applicants or candidates relative to the job requisition;

evaluate the generated ranking list relative to predicted performance data characterizing a predicted ranking performance of the LTOR model to determine whether the LTOR model is valid; and re-train the LTOR model in response to determining that the LTOR model is not valid, wherein the re-training comprises applying a new training data to the ML ranking model, the new training data including hyperparameters that were not included in the training data, and the hyperparameters adjust a learning process of the LTOR model.

10. The system of claim 9, wherein the performance evaluator is programmed to determine that the LTOR model is valid in response to determining that the given applicant or candidate for which similar text data was used to populate the work experience parameter and the job requisition parameter has a greater ranking on the ranking list relative to other applicants or candidates of the plurality of applicants or candidates relative to job requisition.

11. The system of claim 10, wherein the performance evaluator is programmed to:
apply the synthetic test data to the re-trained LTOR model, the LTOR model being programmed to generate a new ranking list to provide a new ranking of each of the plurality of applicants or candidates relative to the job requisition; and evaluate the new ranking list relative to the predicted ranking performance data to determine whether the re-trained LTOR model is valid.

12. One or more non-transitory computer readable medium having instructions executable by a processor to perform a method, the method comprising:
applying a weighting algorithm to respective text data from a text dataset comprising a plurality of different types of text data extracted from a set of published books using a term frequency-inverse document (TF-IDF) algorithm to identify a given portion of text of the respective text data;

generating a first parameter for a work experience for each of a plurality of applicants or candidates based on corresponding text data from the text dataset, the first parameter being a free text parameter generated for a given applicant or candidate of the plurality of applicants and candidates being populated with the given portion of the text of the respective text data, and all first parameters for remaining applicants or candidates is populated with a respective portion of text from different text data as used to populate the first parameter for the given applicant or candidate;

applying the weighting algorithm to the respective text data from the text dataset to identify a different portion of text of the respective text data;

generating a second parameter for a requisition with the different portion of the text of the respective text data for the given applicant or candidate of the plurality of applicants and candidates, wherein the second parameter is a free text parameter, the first parameter and the second parameter for a first applicant or candidate of the plurality of applicants or candidates are extracted from a first published book of the set of published books, and the first parameters and the second parameter for a second applicant or candidate of the plurality of applicants or candidates are extracted from a second published book of the set of published books; and computing a third parameter for one or more of work experience dates for each of the plurality of applicants or candidates with start and end dates, wherein the start and end dates selected for the plurality of applicants or candidates are distributed over a range defined in metadata;

generating synthetic test data based on the computed first and second parameters to test a machine learning (ML) ranking model trained on training data that is from a different data source than the text dataset to validate a performance of the ML ranking model;

causing the synthetic test data to be applied to the ML ranking model to cause the ML ranking model to generate prediction data;

evaluating the prediction data relative to predicted performance data characterizing a predicted performance of the ML ranking model to determine whether the ML ranking model is valid; and re-training the ML ranking model in response to determining that the ML ranking model is not valid, wherein the re-training comprises applying a new training data to the ML ranking model, the new training data including hyperparameters that were not included in the training data, and the hyperparameters adjust a learning process of the ML ranking model.

* * * * *

UNITED STATES PATENT AND TRADEMARK OFFICE
CERTIFICATE OF CORRECTION

PATENT NO. : 11,556,870 B2
APPLICATION NO. : 16/941750
DATED : January 17, 2023
INVENTOR(S) : Inamdar et al.

It is certified that error appears in the above-identified patent and that said Letters Patent is hereby corrected as shown below:

On the Title Page

Column 2, under item (56) Other Publications, Line 4, delete "(Year :" and insert -- (Year: --, therefor.

On page 2, Column 1, under item (56) Other Publications, Line 3, delete "etal:" and insert -- et al: --, therefor.

In the Drawings

On sheet 2 of 27, in FIG. 3, and on the Title Page, the illustrative print figure, under Reference Numeral 324, Line 1, delete "REQUISTION" and insert -- REQUISITION --, therefor.

In the Claims

In Column 29, Line 67, in Claim 1, delete "re- training" and insert -- re-training --, therefor.

In Column 30, Line 17, in Claim 4, delete "clam" and insert -- claim --, therefor.

In Column 30, Line 26, in Claim 5, before "of" insert -- method --, therefor.

In Column 30, Line 53, in Claim 9, delete "frequency- inverse" and insert -- frequency-inverse --, therefor.

Signed and Sealed this
Tenth Day of October, 2023

*Katherine Kelly Vidal*
*Director of the United States Patent and Trademark Office*